United States Patent
Horishi et al.

(10) Patent No.: US 6,356,310 B1
(45) Date of Patent: Mar. 12, 2002

(54) SIGNAL CONVERTING APPARATUS AND METHOD FOR CONVERTING A FIRST DIGITAL PICTURE INTO A SECOND DIGITAL PICTURE HAVING A GREATER NUMBER OF PIXELS THAN THE FIRST DIGITAL PICTURE

(75) Inventors: Takashi Horishi; Tetsujiro Kondo; Hideo Nakaya, all of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/632,057

(22) Filed: Aug. 3, 2000

Related U.S. Application Data

(63) Continuation of application No. 09/130,614, filed as application No. PCT/JP97/04562 on Dec. 11, 1997, now Pat. No. 6,115,073.

(30) Foreign Application Priority Data

Dec. 11, 1996 (JP) .............................................. 8-330606

(51) Int. Cl.[7] .................................................. H01N 7/01
(52) U.S. Cl. ...................................... 348/458; 348/452
(58) Field of Search .................................. 348/458, 452, 348/448, 441, 581, 446; 382/298–300

(56) References Cited

U.S. PATENT DOCUMENTS

| | | |
|---|---|---|
| 4,897,716 A | 1/1990 | Drewery et al. |
| 5,194,937 A | 3/1993 | Lee et al. |
| 5,249,037 A | 9/1993 | Sugiyama et al. |
| 5,475,438 A | 12/1995 | Bretl |
| 5,583,575 A | 12/1996 | Arita et al. |
| 5,748,250 A | 5/1998 | Markandey et al. |
| 5,786,862 A * | 7/1998 | Kim ............................ 348/452 |

FOREIGN PATENT DOCUMENTS

| | | |
|---|---|---|
| EP | 164 203 | 12/1985 |
| EP | 746 157 | 12/1996 |
| JP | 60-245384 | 12/1985 |
| JP | 8-51599 | 2/1996 |
| JP | 8-307834 | 11/1996 |
| JP | 9-51510 | 2/1997 |

* cited by examiner

Primary Examiner—Victor R. Kostak
(74) Attorney, Agent, or Firm—Frommer Lawrence & Haug LLP; William S. Frommer; Joe H. Shallenburger

(57) ABSTRACT

A delay register section 31 holds SD pixels of a luminance signal and a classification section 33 decides a class, reads a coefficient corresponding to the decision result from a coefficient RAM section 40, and outputs the coefficient to a product-sum section 38. The product-sum section 38 captures the pixel data for 17 taps from the delay register section 31, converts the pixel data into seven taps, and outputs them to the product-sum section 38. The product-sum section 38 performs the product-sum operation of pixel data and coefficients and outputs the operation result as HD pixels. An interpolation pixel operation section 42 applies a simple interpolation processing different from the case of a luminance signal to the pixel data of a color signal component to generate HD pixels of a color signal. Thus, downsizing and cost reducing can be realized.

12 Claims, 24 Drawing Sheets

FIVE PIXELS IN FIELD

SMALL AREA

THIRTEEN PIXELS IN FIELD

LARGE AREA

FIG/17

| MOVEMENT CLASS | 0 | 1 | 2 |
|---|---|---|---|
| CLASS BEFORE DEGENERATED | 0~15 | 16~31 | 32~47 |
| CLASS AFTER DEGEERATED | 0~15 | 16~23 | 24~31 |

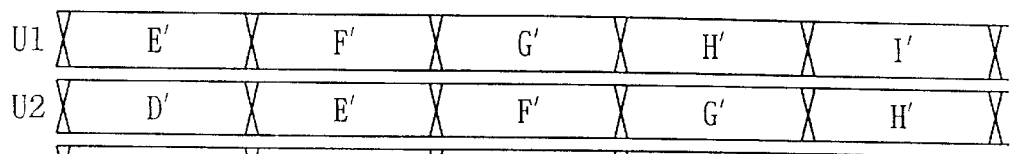
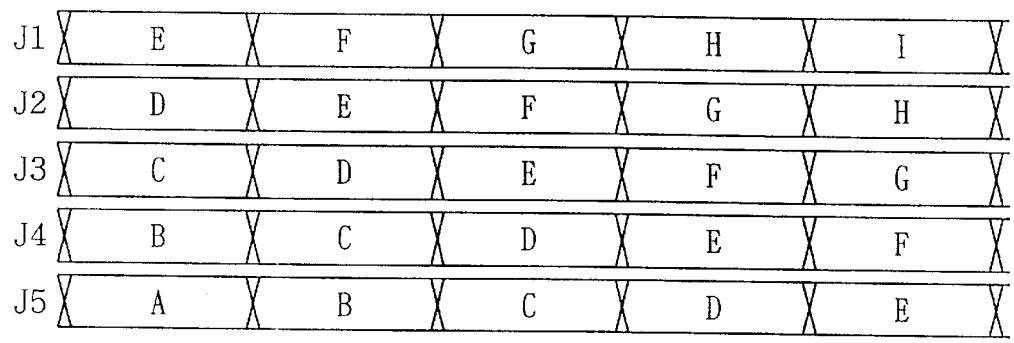
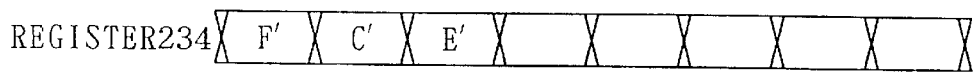
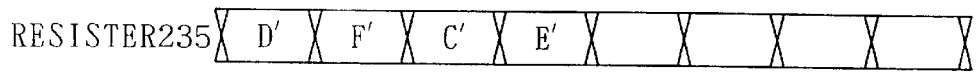
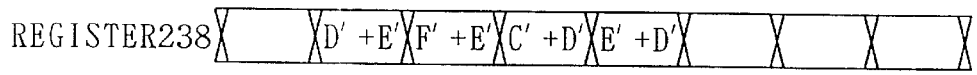
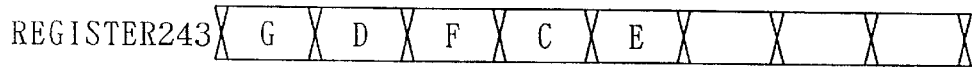
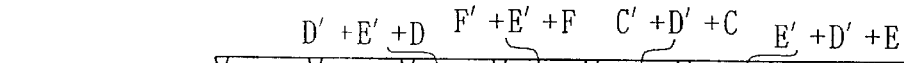
$yc1 = \frac{1}{8}U4 + \frac{1}{8}U3 + \frac{1}{4}J4 + \frac{1}{2}J3$ $\quad yc2 = \frac{1}{8}U2 + \frac{1}{8}U3 + \frac{1}{4}J2 + \frac{1}{2}J3$
FIG.28

SIGNAL CONVERTING APPARATUS AND METHOD FOR CONVERTING A FIRST DIGITAL PICTURE INTO A SECOND DIGITAL PICTURE HAVING A GREATER NUMBER OF PIXELS THAN THE FIRST DIGITAL PICTURE

This application is a con of Ser. No. 09/130,614, filed Jun. 7, 1998 now U.S. Pat. No. 6,115,073, which is a 371 of PCT/JP97/04562.

DESCRIPTION

1. Field of the Art

The present invention relates to a signal converting apparatus and method, particularly to a signal converting apparatus and method of efficiently processing the components of a luminance signal and a color signal and thereby, generating a higher-resolution picture signal.

2. Background Art

The standard telecast in Japan uses the NTSC system. Recently, however, a higher-quality telecast system represented by hi-vision is developed and gradually spread. In the case of the NTSC system, the number of scanning lines is set to 525 and the aspect ratio is set to 4:3. In the case of the hi-vision system, however, the number of scanning lines is set to 1,125 and the aspect ratio is set to 16:9. Therefore, when using the hi-vision system, it is possible to enjoy realistic pictures having higher resolution.

To display a picture according to the NTSC system on a television receiver according to the hi-vision system, it is necessary to convert an SD (Standard Definition) signal corresponding to a video signal according to the NTSC system into an HD (High Definition) signal corresponding to a higher-resolution video signal. Hereafter, a signal before converted into more number is properly referred to as an SD signal, SD data, or an SD pixel and a signal after converted into more number is referred to as an HD signal, HD data, or an HD pixel.

Conversion of the SD signal into the HD signal has been performed by simple interpolation in the horizontal direction and vertical direction.

However, because the interpolation is performed by a cascaded FIR filter, the resolution of an HD signal is the same as that of an original SD signal. When a normal picture is used as a conversion object, the resolution of an HD signal is inferior to that of an SD signal due to conversion loss in a static picture section because the vertical interpolation is performed through in-field processing but inter-field correlation is not used.

Therefore, the applicant proposed in Japanese Patent Application No. 6-205934 a system of performing class division in accordance with a three-dimensional (space-time) distribution at a picture signal level serving as an input signal and operating an optimum estimated value as an HD signal by using a predicted coefficient previously obtained through learning for each class.

However, though a high-resolution picture can be obtained by processing both luminance signal and color signal by the above proposed system, problems occur that the capacity of a ROM for storing coefficient increases, an apparatus increases in size and moreover, the cost increases.

DISCLOSURE OF INVENTION

The present invention is made to solve the above problems and provides a signal converting apparatus and a signal converting method making it possible to realize downsizing and cost saving.

To solve the above problems, in the present invention, a signal converting apparatus for converting a first digital picture signal into a second digital picture signal different from the first digital picture signal is provided with a converting circuit for converting the above first digital picture signal into a luminance signal component and a color signal component, a memory for storing a coefficient to convert the luminance signal component of the above first digital picture signal into a luminance component of the above second digital picture signal for each class, a class classification circuit for deciding a class from the luminance signal component of the above first digital picture signal; a first arithmetic circuit for reading a coefficient corresponding to a class decided by the above class classification circuit from the above memory, performing the product-sum-operation of the read coefficient and the luminance signal of the above first digital picture signal, and obtaining the luminance signal component of the above second digital picture signal, and a second arithmetic circuit for performing the product-sum-operation of a coefficient based on the physical relationship of the scanning lines of the above first digital picture signal and the above second digital picture signal, and the color signal component of the above first digital picture signal, and obtaining the color signal component of the above second digital picture signal.

Moreover, in the present invention, a signal converting method for converting a first digital picture signal into a second digital picture signal different from the first digital picture signal, converts a first digital picture signal into a luminance signal component and a color signal component, decides a class from the luminance signal component of the above first digital picture signal, reads out a coefficient corresponding to the above decided class to convert the luminance signal component of the above first digital picture signal into a luminance component of the above second digital picture signal read from a memory, and performs the product-sum-operation of the read coefficient and the luminance component of the above first digital picture signal to obtain the luminance signal component of the above second digital picture signal, and performs the product-sum-operation of a coefficient based on the physical relationship of the scanning lines of the above first digital picture signal and the above second digital picture signal and the color signal component of the above first digital picture signal to obtain the color signal component of the above second digital picture signal.

BRIEF DESCRIPTION OF DRAWINGS

FIG. 28 is a timing chart for explaining the operation of the interpolation pixel operation section in FIG. 26.

BEST MODE FOR CARRYING OUT THE INVENTION

Figure 1:
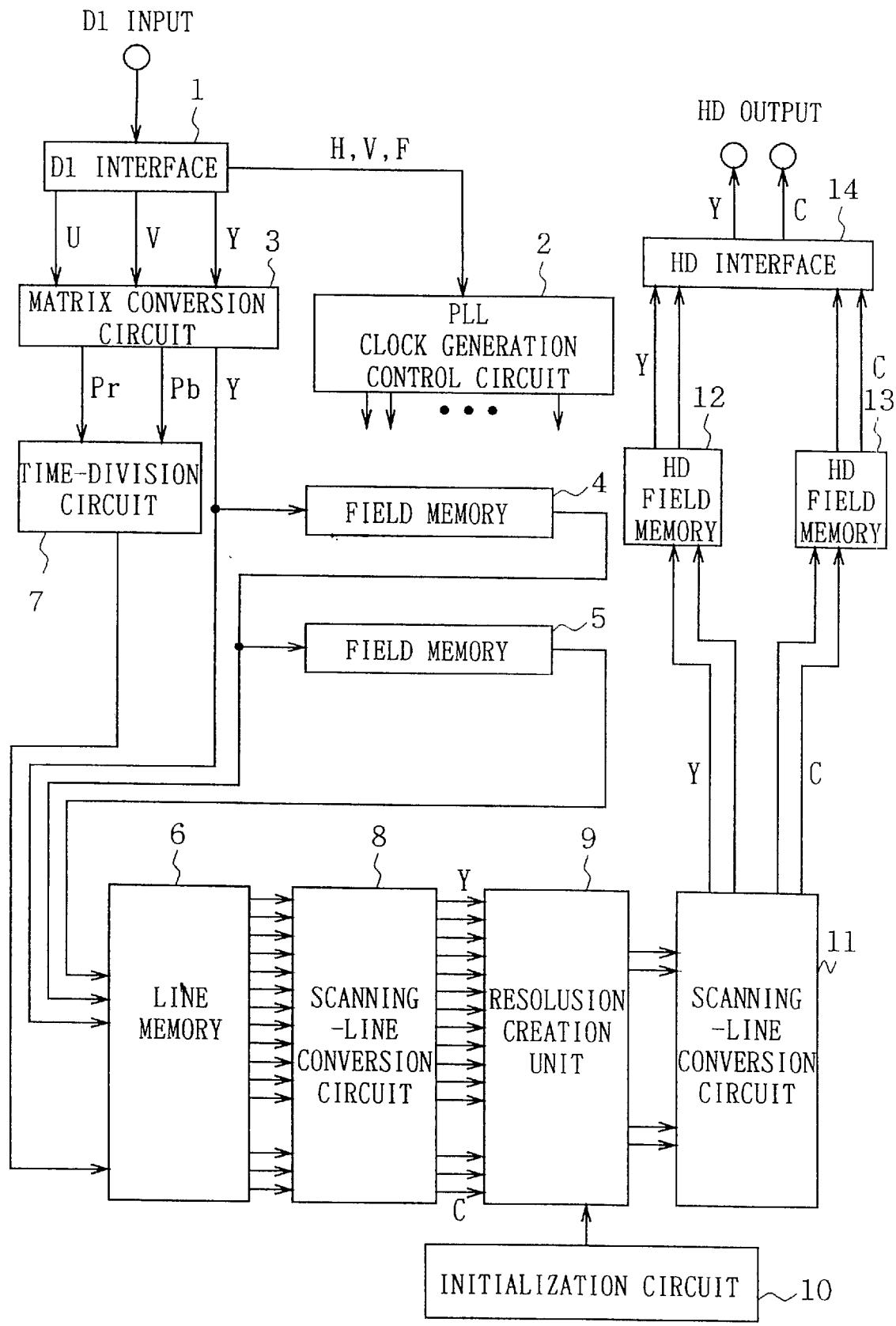
FIG. 1 is a block diagram showing a structural example of a signal converting apparatus of the present invention.

FIG. 1 is a block diagram showing the structure of a signal converting apparatus of the present invention. Digital picture data according to, for example, the NTSC system and according to D1 which is the specification of a digital VTR is input to an interface 1. The interface 1 separates and extracts a horizontal sync signal H, vertical sync signal V, and frame sync signal F from the input picture data and outputs them to a PLL-clock generation control circuit 2. The PLL-clock generation control circuit 2 generates a clock synchronously with an input signal and supplies it to each circuit.

Moreover, the interface 1 separates a luminance signal Y and color signals U and V from input picture data and outputs them to a matrix conversion circuit 3. The matrix conversion circuit 3 generates color-difference signals Pb and Pr in accordance with input signals and outputs them to a time-division circuit 7. The time-division circuit 7 time- divides the input color-difference signals Pb and Pr and supplies them to a line memory 6.

The matrix conversion circuit 3 directly supplies the luminance signal Y to the line memory 6 and moreover outputs the signal Y to the line memory 6 through a cascaded field memory 4 and moreover through a field memory 5. Therefore, a luminance signal at the present field, a luminance signal one field before, and a luminance signal one frame (two fields) before are supplied to the line memory 6.

The line memory 6 stores luminance signals for seven lines of the present field, luminance signals for two lines one field before, and luminance signals for three lines one frame before and supplies them to a scanning-line conversion circuit 8. Moreover, the line memory 6 stores color signal data for three lines of the present field supplied from the time-division circuit 7 and supplies them to the scanning-line conversion circuit 8.

Figure 2:
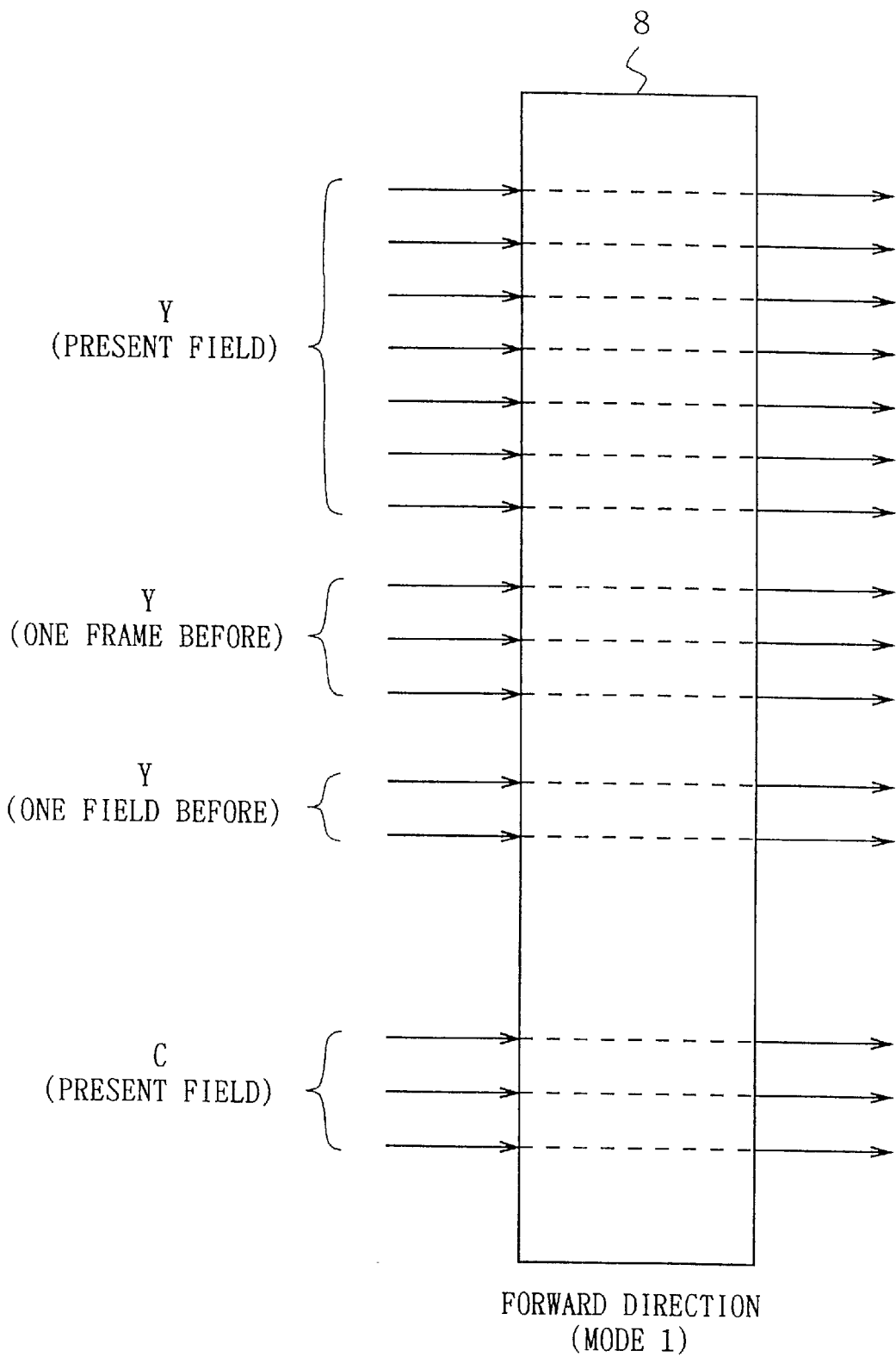
FIG. 2 is an illustration for explaining the operation of the scanning-line conversion circuit 8 in FIG. 1 in the forward direction.
Figure 3:
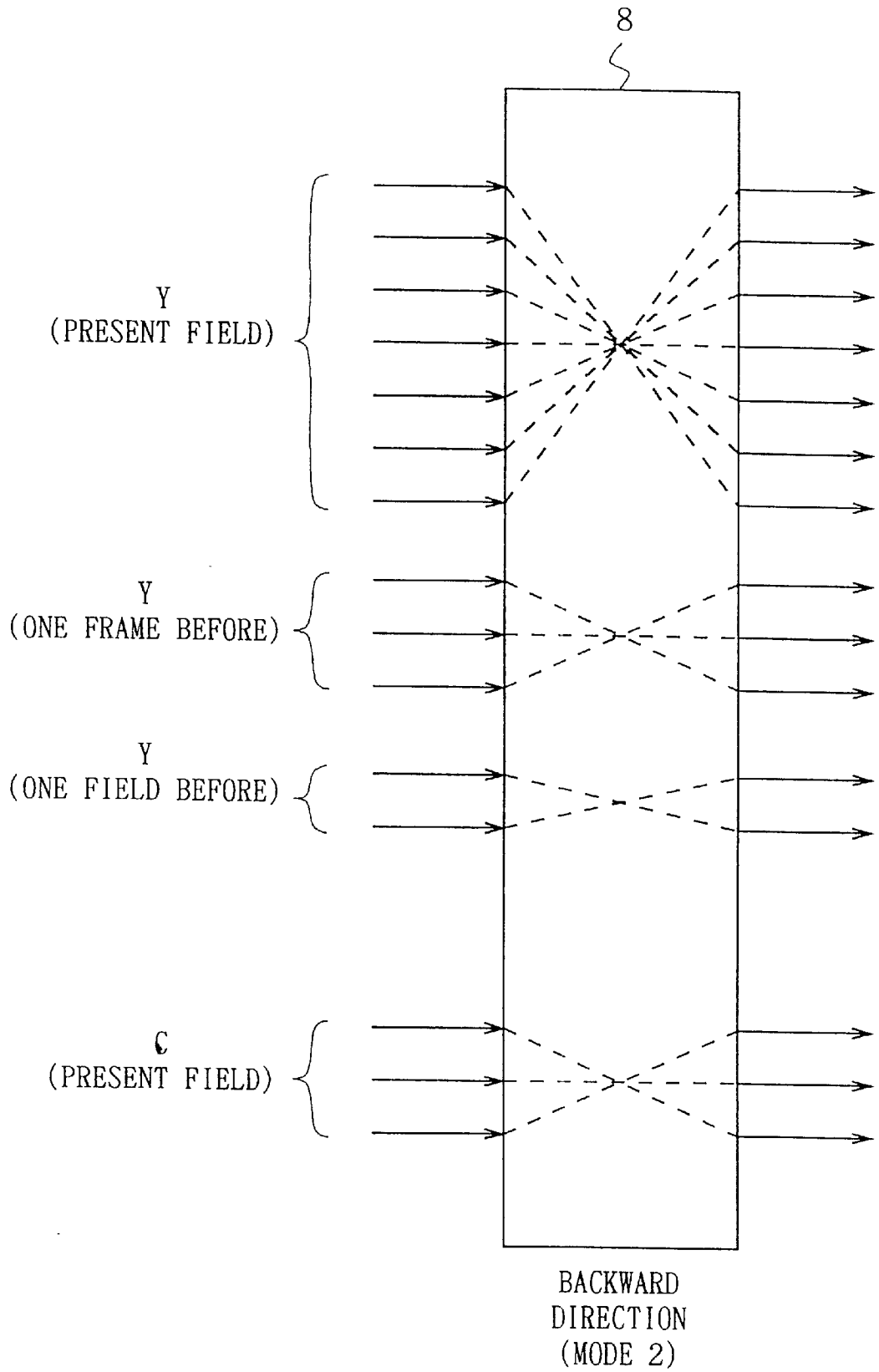
FIG. 3 is an illustration for explaining the operation of the scanning-line conversion circuit 8 in FIG. 1 in the backward direction.

The scanning-line conversion circuit 8 directly outputs input luminance signal Y and color signal C to a resolution creation unit 9 in a mode 1 (to be described later by referring to FIG. 4) as shown in FIG. 2. In a mode 2 (to be described later by referring to FIG. 4), however, the circuit 8 converts the order of scanning lines so that the order of luminance signals or color signals of each field is vertically inverted, that is, a higher scanning line is arranged lower and outputs the signals to the resolution creation unit 9 as shown in FIG. 3.

The resolution creation unit 9 performs initialization correspondingly to the data supplied from an initialization circuit 10 and thereafter, processes the pixel data corresponding to a luminance signal Y input from the scanning-line conversion circuit 8 and the pixel data (SD data) corresponding to a color signal C separately from each other, and generates higher-resolution pixel data (HD data).

Figure 4:
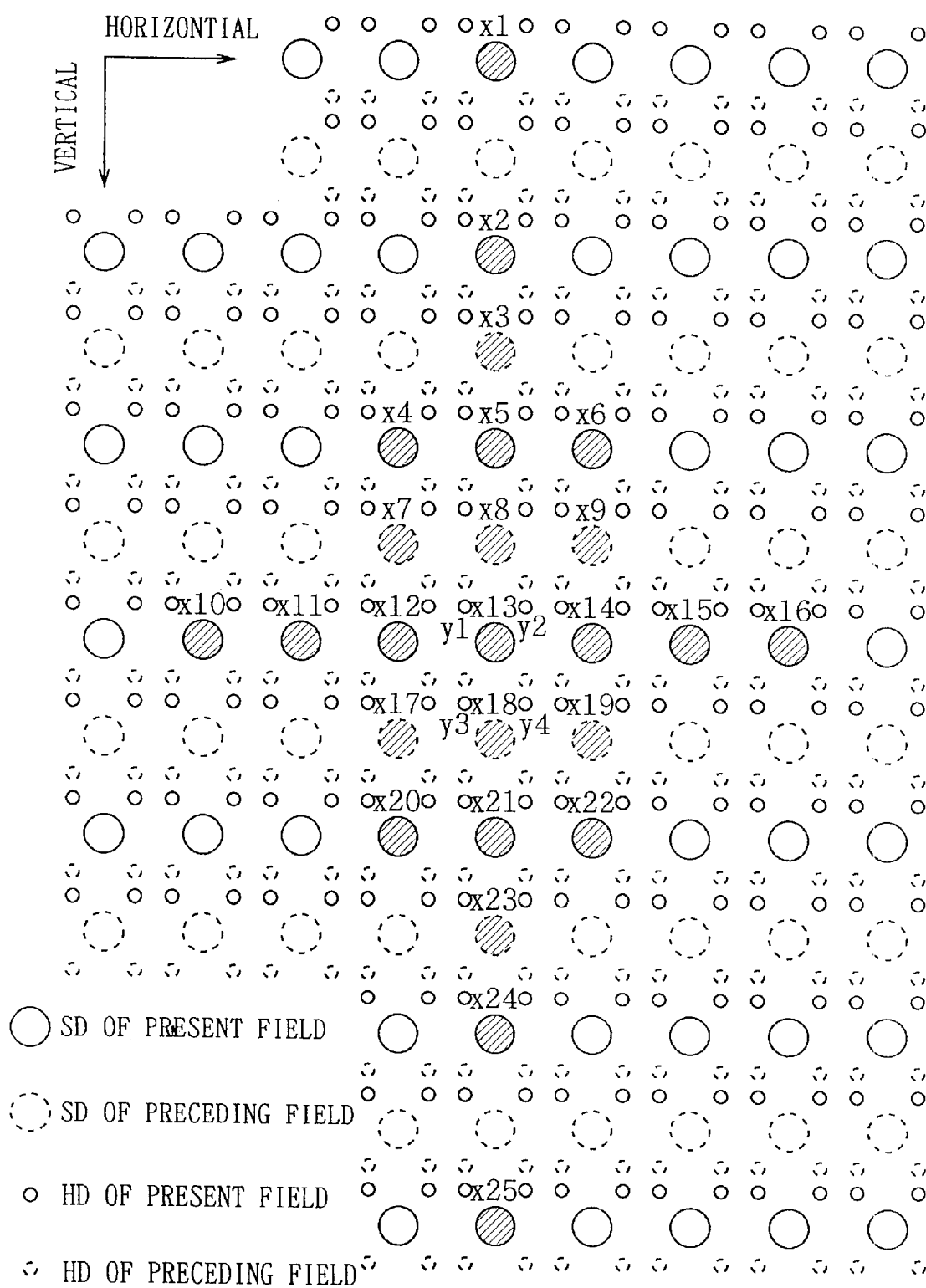
FIG. 4 is an illustration for explaining the processing by the resolution creation unit 9 in FIG. 1.

That is, the resolution creation unit 9, as shown in FIG. 4, generates the HD data shown by small circles in FIG. 4 in accordance with the SD data shown by large circles in FIG. 4. In FIG. 4, a continuous line shows the pixel data of the present field and a broken line shows the pixel data of the last field.

The order of the scanning lines of an HD signal generated by the resolution creation unit 9 is returned to the original order by the scanning-line conversion circuit 11. That is, the scanning-line conversion circuit 11 outputs the lines of the HD signal input from the resolution creation unit 9 in the order of their own because the order of scanning lines is not changed by the scanning-line conversion circuit 8 in the mode 1 as shown in FIG. 2. In the mode 2, however, because the order is changed by the scanning-line conversion circuit 8 as shown in FIG. 3, the processing for returning the order to the original order is performed. The luminance signal components output from the scanning-line conversion circuit 11 are supplied to an HD field memory 12, the color signal components output from the circuit 11 are supplied to an HD field memory 13, and are stored respectively.

In the field memories 12 and 13, the processing for converting the number of scanning lines from 1,050 to 1,125 is performed respectively and thereafter, the scanning lines are supplied to an HD interface 14. The HD interface 14 processes an input HD signal, converts the signal into an HD signal corresponding to the format of hi-vision and outputs it.

Then, the operations are described below. The interface 1 separates a luminance signal Y and color signals U and V from input picture data according to the NTSC system and outputs them to the matrix conversion circuit 3. The matrix conversion circuit 3 directly supplies the luminance signal Y to the line memory 6 and moreover outputs the signal Y to the line memory 6 through the field memories 4 and 5 after delaying the signal Y by the time equivalent to one frame (two fields). In this case, a luminance signal delayed by the time equivalent to one field by the field memory 4 is also supplied to the line memory 6. Moreover, the matrix conversion circuit 3 generates color difference signals Pb and Pr, and the time-division circuit 7 time-divides the color signals Pb and Pr to supply the signal Pb or Pr to the line memory 6.

The line memory 6 supplies the pixel data of luminance signals for seven lines of an input predetermined field, pixel data of luminance signals for three lines one frame before delayed by the field memories 4 and 5, and pixel data of luminance signals for two lines delayed by the field memory 4 to the scanning-line conversion circuit 8.

In the mode 1, the scanning-line conversion circuit 8 directly supplies the input luminance signals for seven lines of the present field, luminance signals for three lines one frame before, and luminance signals for two lines one field before to the resolution creation unit 9 in the order of their own as shown in FIG. 2. Moreover, the circuit 8 supplies the pixel data of color signals for three lines to the resolution creation unit 9 in the order of their own.

In the mode 2, however, the circuit 8 supplies the luminance signals for seven lines of the present field to the resolution creation unit 9 by changing the order of the luminance signals so that the uppermost line is brought to the lowermost line and the lowermost line is brought to the uppermost line as shown in FIG. 3. Moreover, the circuit 8 supplies the luminance signals of the field one frame before and the luminance signals one field before to the resolution creation unit 9 by changing the order of the signals so that the uppermost line is brought to the lowermost line and the lowermost line is brought to the uppermost line. Furthermore, the circuit 8 supplies the color difference signals for three lines to the resolution creation unit 9 by changing the order of the signals so that the signal of the uppermost line is brought to the uppermost position and the signal of the lowermost line is brought to the lowermost position.

Then, the mode 1 and mode 2 are described below. As shown in FIG. 4, when a noticed pixel is assumed as an SD pixel x13, an HD pixel y1 at the left top of the SD pixel x13 and an HD pixel y2 at the right top of the SD pixel x13 and moreover, an HD pixel y3 at the left bottom of the SD pixel x13 and an HD pixel y4 at the right bottom of the SD pixel x13 are generated correspondingly to the SD pixel x13. The mode 1 generates two HD pixels y1 and y2 at the upper side and the mode 2 generates the HD pixels y3 and y4 at the lower side.

Figure 5:
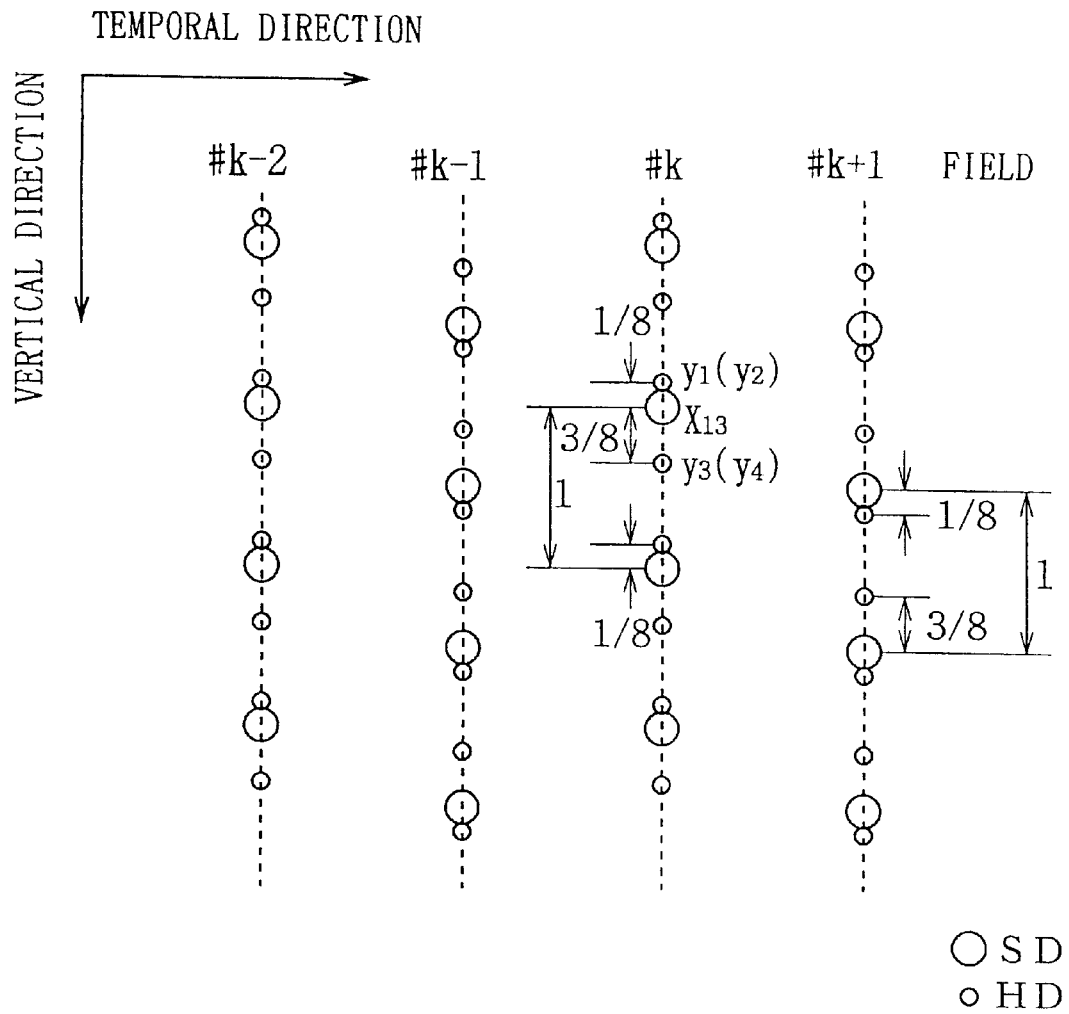
FIG. 5 is an illustration for explaining the positional relation between an SD pixel and an HD pixel.

As shown in FIG. 5, when assuming the vertical interval between SD pixels in each field as 1, the vertical intervals between the HD pixels y1 and y2 on one hand and the SD pixel x13 on the other become 1/8. Moreover, the intervals between the HD pixels y3 and y4 on one hand and the SD pixel x13 on the other become 3/8. Therefore, the vertical intervals between the HD pixels y1 and y2 on one hand and the HD pixels y3 and y4 on the other become 4/8.

The resolution creation unit 9 generates HD pixel data in accordance with input SD pixel data and outputs the data to the scanning-line conversion circuit 11. More minute operations of the resolution creation unit 9 are described later by referring to FIG. 6.

The scanning-line conversion circuit 11 outputs the pixel data of each line of a luminance signal and the pixel data of each line of a color signal input in the mode 1 to the field memory 12 or 13 in the order of their own. In the resolution creation unit 9, 525 scanning lines are converted into 1,050 scanning lines. In the field memories 12 and 13, 1,050 scanning lines are further converted into 1,125 scanning lines and supplied to the interface 14. Conversion of 1,050 scanning lines into 1,125 scanning lines-is performed by adding 75 dummy scanning lines. This is performed by reading substantially-invalid 75 scanning lines from, for example, the field memories 12 and 13.

The interface 14 outputs a luminance signal Y and a color signal C supplied from the field memories 12 and 13 as HD signals corresponding to the format of hi-vision.

In the case of the embodiment in FIG. 1, 1,050 scanning lines are converted into 1,125 scanning lines by the field memories 12 and 13. However, when it is unnecessary to change the number of scanning lines from 1,050 to 1,125, the field memories 12 and 13 are also unnecessary.

Figure 6:
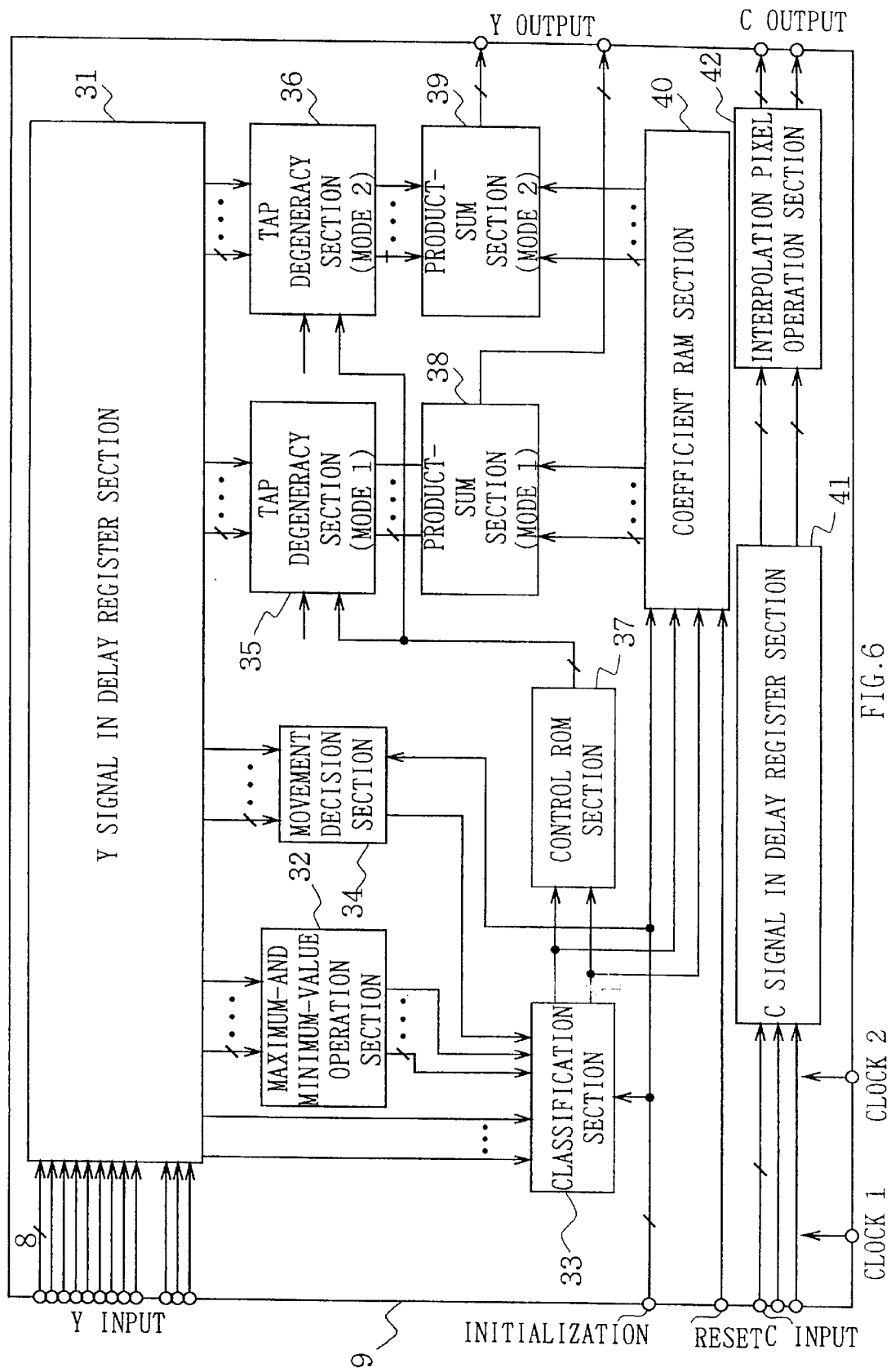
FIG. 6 is a block diagram showing a structural example of the resolution creation unit 9 in FIG. 1.

FIG. 6 shows a detailed structure of the resolution creation unit 9. Luminance signals for seven lines of the present field, those for three lines one frame before, and those for two lines one field before are supplied to and stored in a delay register section 31 from the scanning-line conversion circuit 8.

Figure 7:
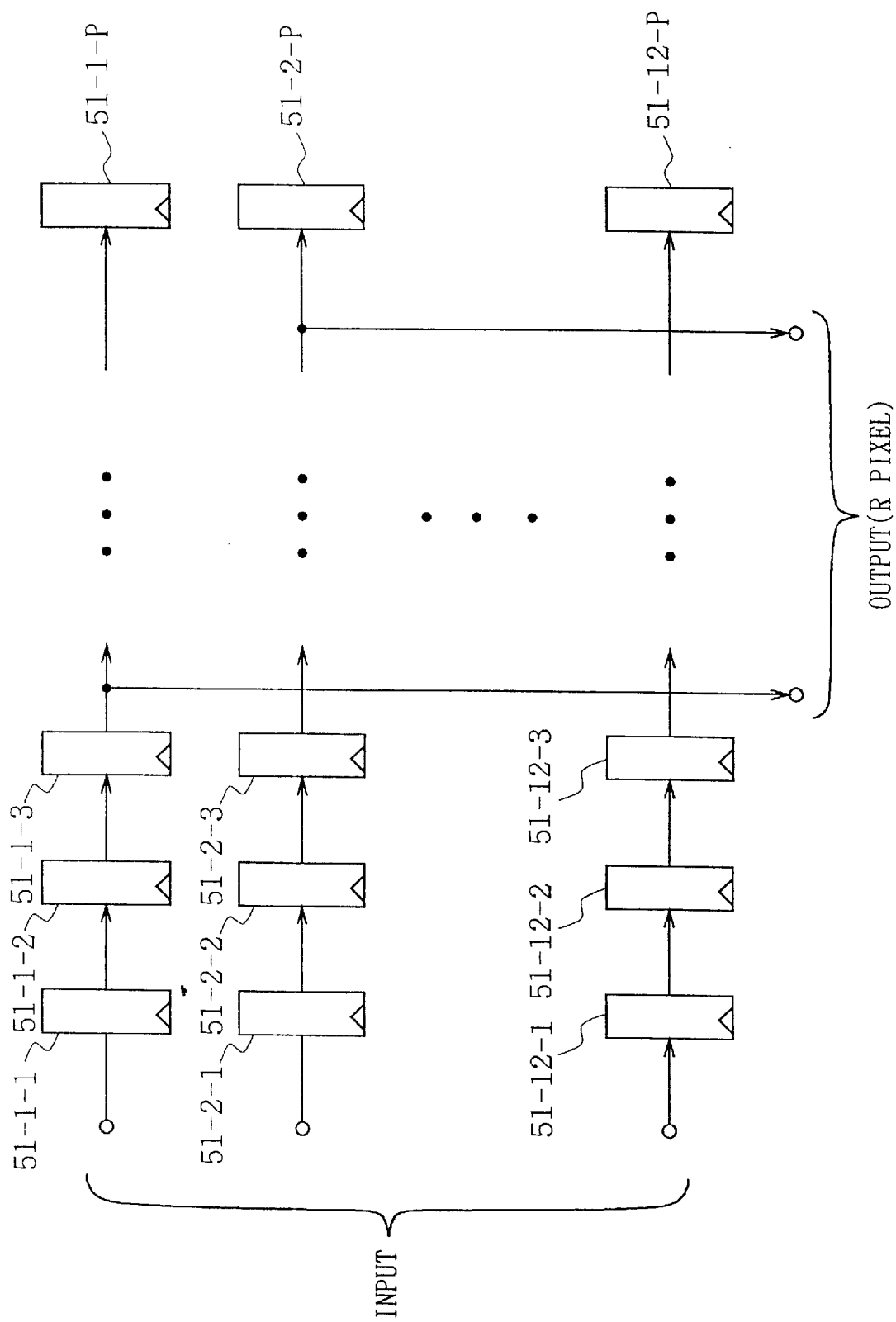
FIG. 7 is a block diagram showing a structural example of the delay register section 31 in FIG. 6.

FIG. 7 shows a structural example of the delay register section 31. As shown in FIG. 7, the display register section 31 is provided with registers 51-1 to 51-12 for twelve lines so as to store pixel data for twelve lines respectively and P registers are cascaded to each line so that P pixel data values can be held. For example, registers 51-1-1 to 51-1-P are cascaded to the uppermost line and registers 51-2-1 to 51-2-P are cascaded to the second line. Moreover, pixel data held by a predetermined register is properly read and supplied to a classification section 33, maximum- and minimum-value operation section 32, movement decision section 34, and tap degeneracy section 35 or 36. Pixel data to be supplied depends on the section.

Figure 8:
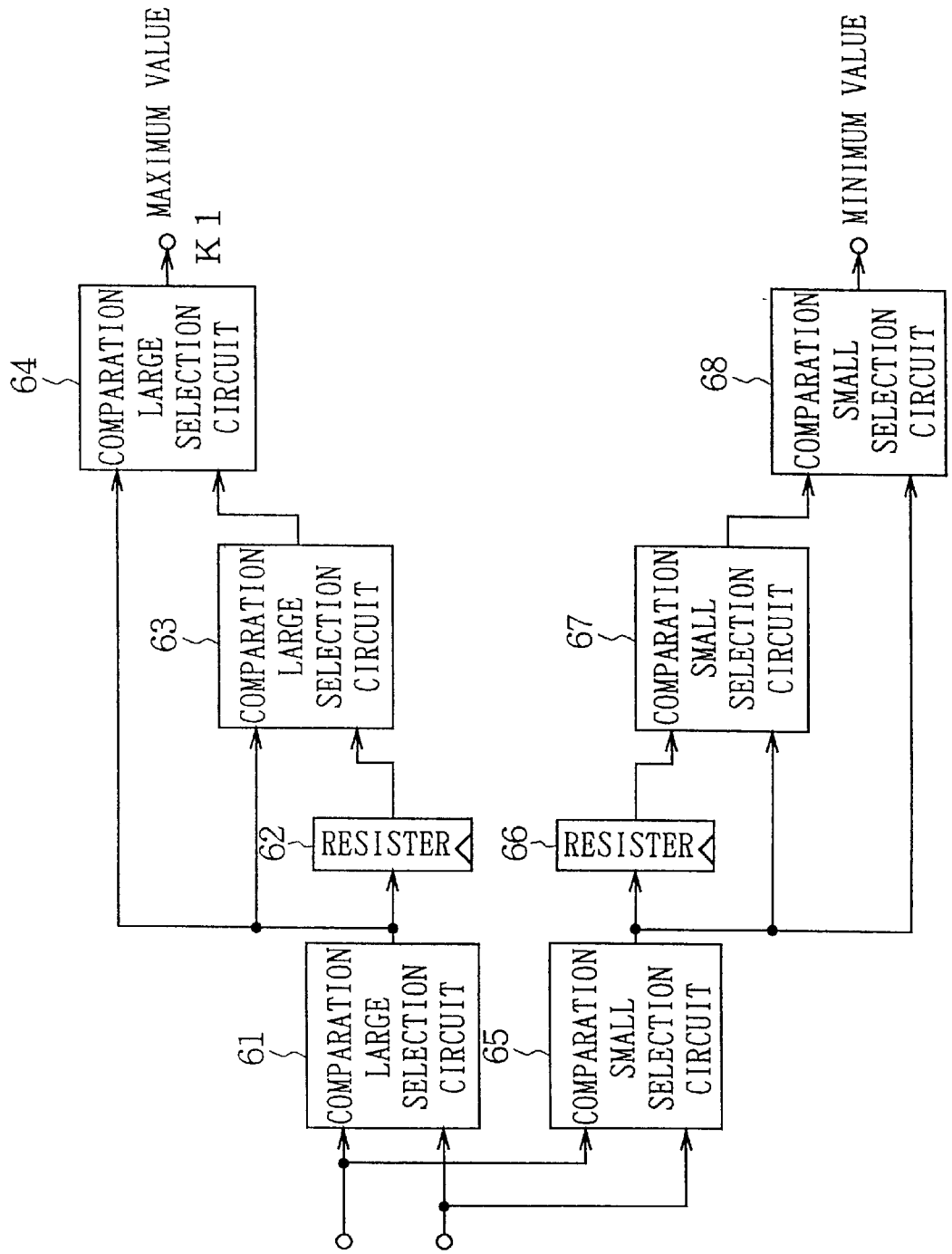
FIG. 8 is a block diagram showing a structural example of the maximum- and minimum-value operation section 32 in FIG. 6.

FIG. 8 shows a structural example of the maximum- and minimum-value operation section 32. As shown in FIG. 8, in the maximum- and minimum-value operation section 32, predetermined two pixel data values are supplied to a comparison large selection circuit 61 and a comparison small selection circuit 65 respectively. The comparison large selection circuit 61 selects larger one of two inputs and supplies selected pixel data to the register 62 and one input of the comparison large selection circuit 63 or comparison large selection circuit 64. The output of the register 62 is supplied to the other input of the comparison large selection circuit 63 and the output of the comparison large selection circuit 63 is supplied to the other input of the comparison large selection circuit 64.

The comparison small selection circuit 65 selects smaller one of two pixel data values and outputs it to a register 66 and supplies the smaller pixel data value to one inputs of comparison small selection circuits 67 and 68. The output of the register 66 is supplied to the other input of the comparison small selection circuit 67 and the output of the comparison small selection circuit 67 is supplied to the other input of the comparison small selection circuit 68. Moreover, a maximum value is output from the comparison large selection circuit 64 and a minimum value is output from the comparison small selection circuit 68.

Figure 9:
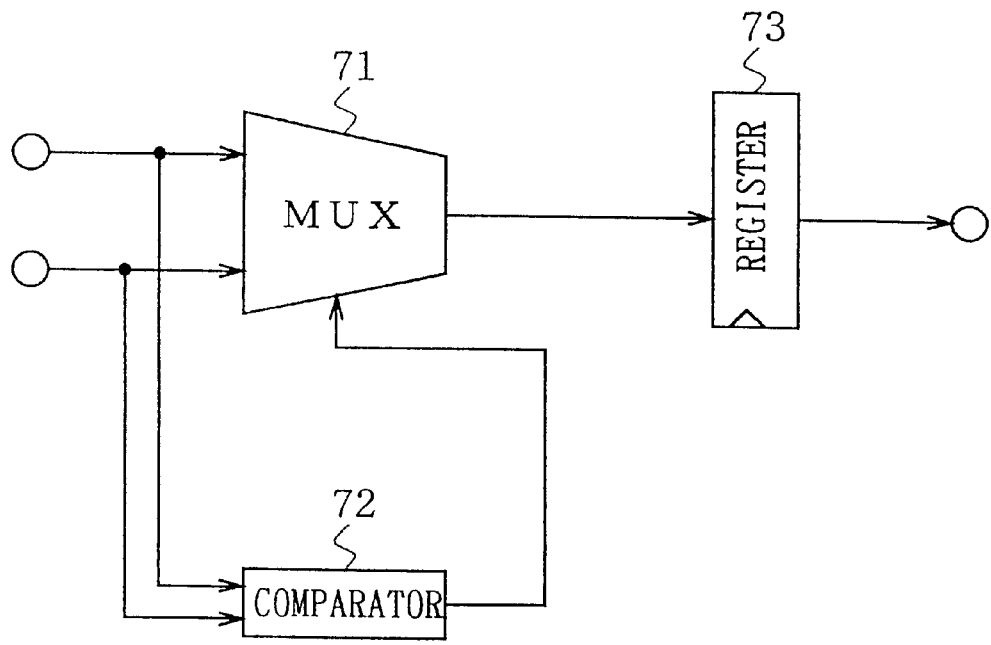
FIG. 9 is a block diagram showing a structural example of the comparison large selection circuit 61 in FIG. 8.

The comparison large selection circuit 61 is constituted as shown in FIG. 9. That is, two inputs are input to a multiplexer (MUX) 71 and a comparator 72. The comparator 72 compares the magnitudes of two input pixel data values and outputs a selection signal for selecting larger one of two data values to the multiplexer 71. The output of the multiplexer 71 is output through a register 73. Moreover, the comparison large selection circuits 63 and 64 are constituted same as the comparison large selection circuit 61 is.

Figure 10:
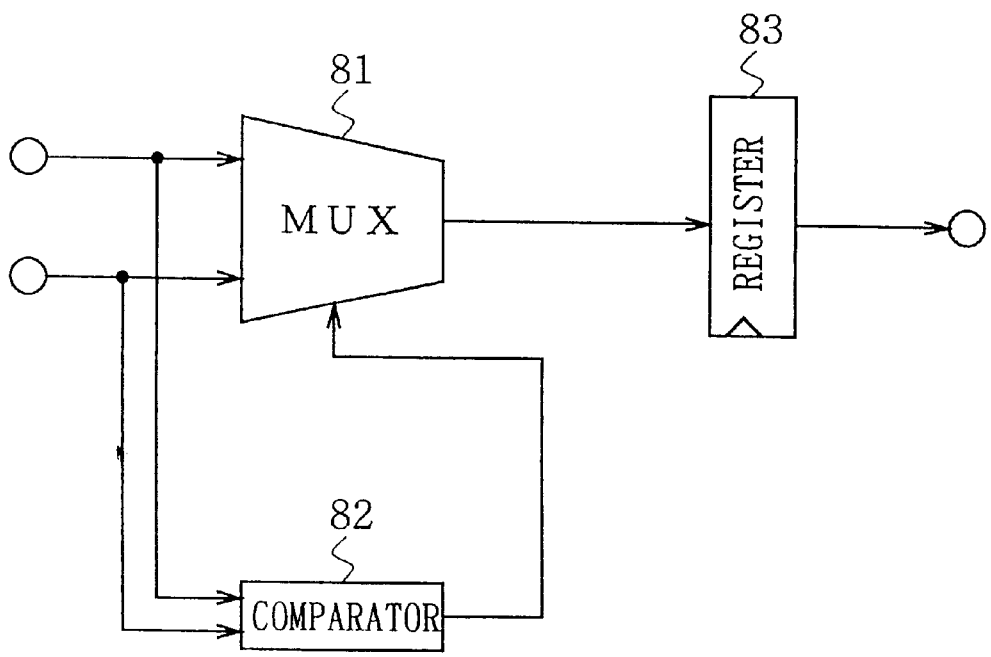
FIG. 10 is a block diagram showing a structural example of the comparison small selection circuit 65 in FIG. 8.

The comparison small selection circuit 65 is constituted as shown in FIG. 10. Two pixel data values are input to a multiplexer 81 and a comparator 82. The comparator 82 compares the magnitudes of two input pixel data values and outputs a selection signal so that the multiplexer 81 selects smaller one of the data values. The output of the multiplexer 81 is output through a register 83.

Figure 11:
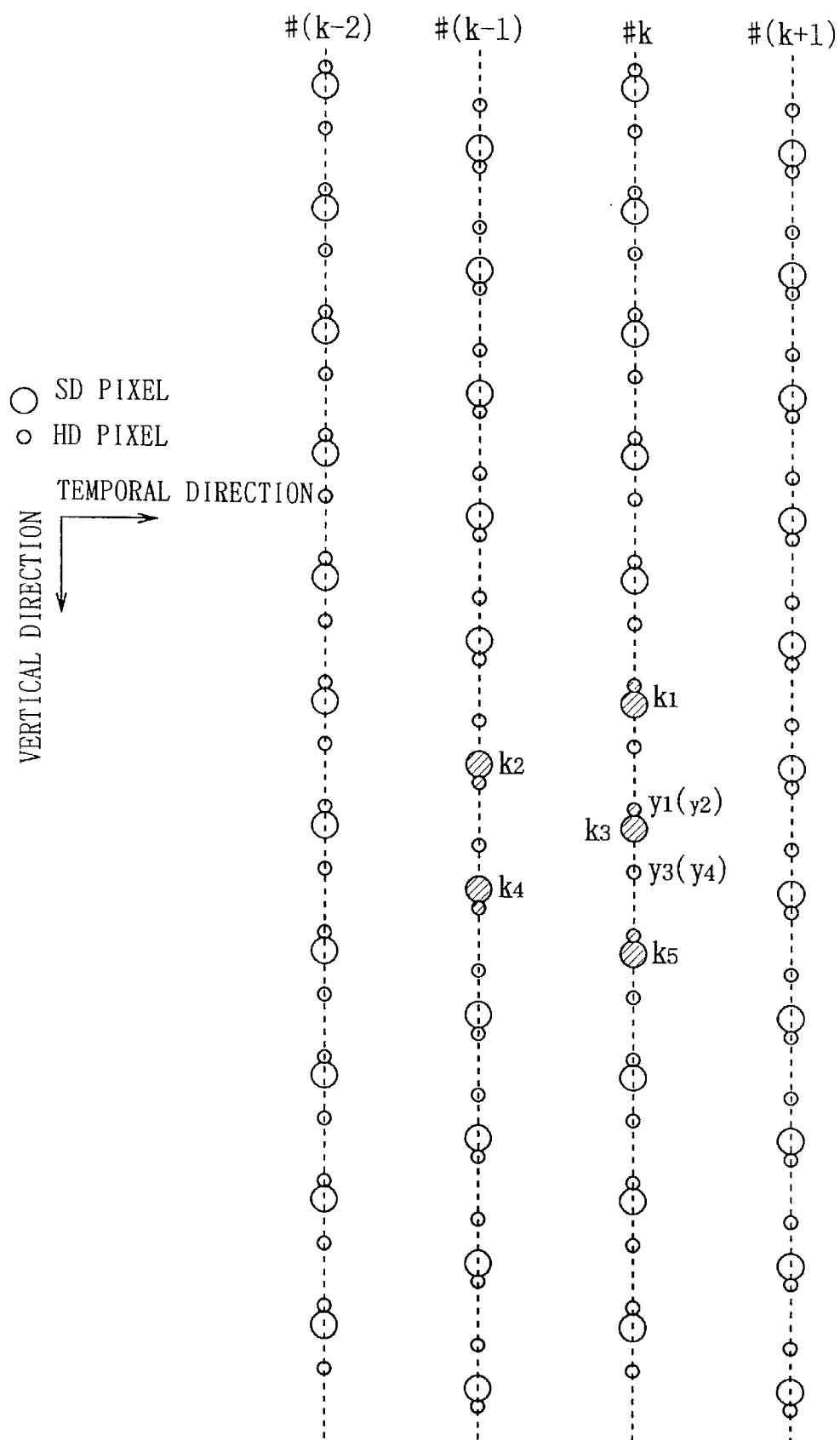
FIG. 11 is an illustration for explaining the range of spatial-class pixels.

Then, the operations are described below. For example, the classification section 33 mainly requires the maximum and minimum values of pixels in a predetermined range necessary for the classification (space class) for showing a waveform in a space. The maximum- and minimum-value operation section 32 operates the maximum and minimum values. In this case, as shown in FIG. 11, the section 32 selects five SD pixels k1 to k5 nearby the HD pixels y1 and y2 shown in FIG. 4 in order to generate the HD pixels y1 and y2 and operates the maximum and minimum values of these five pixels.

In this case, the SD pixels k1 and k2 are first input to the comparison large selection circuit 61. In the comparison large selection circuit 61, the comparator 72 compares the magnitudes of the SD pixels k1 and k2 and outputs a selection signal so that the multiplexer 71 selects larger one of them. As a result, larger one of the SD pixels k1 and k2 is held by the register 73. This data is supplied to and held by the register 62 in FIG. 8.

Then, the comparison large selection circuit 61 compares the magnitudes of SD pixels k3 and k4. Then, similarly to the above-described case, larger pixel is held by the register 73. One larger of the SD pixels k3 and k4 held by the register 73 is supplied to the other input of the comparison large selection circuit 63. The comparison large selection circuit 63 compares larger one of the SD pixels k1 and k2 held by the register 62 with larger one of the SD pixels k3 and k4 held by the register 73 and selects larger one to output it to the comparison large selection circuit 64 through the register 73.

Then, the comparison large selection circuit 61 compares; the SD pixel k5 with a pixel 0 (virtual pixel). In this case, the SD pixel k5 is selected and supplied to the other input of the comparison large selection circuit 64. The comparison large selection circuit 64 compares the SD pixel supplied from the comparison large selection circuit 63 with the SD pixel k5 supplied from the comparison large selection circuit 61 and selects and outputs larger one. Thus, the comparison large selection circuit 64 selects and outputs the maximum one of the SD pixels k1 to k5.

The comparator 82 of the comparison small selection circuit 65 first compares the magnitudes of the SD pixels k1 and k2 and outputs a selection signal for the multiplexer 81 to select smaller one. Thereby, smaller one of the SD pixels k1 and k2 is output through the register 83 and held by the register 66. Then, the comparison small selection circuit 65 compares the magnitudes of the SD pixels k3 and k4 and selects and outputs smaller one to the comparison small selection circuit 67. The comparison small selection circuit 67 compares smaller one of the SD pixels k1 and k2 supplied from the register 66 with smaller one of the SD pixels k3 and k4 supplied from the comparison small selection circuit 65 and outputs smaller one to the comparison small selection circuit 68.

Moreover, the comparison small selection circuit 65 compares the SD pixel k5 with the maximum virtual pixel data value, selects the SD pixel k5 as smaller one, and supplies it to the comparison small selection circuit 68 through the register 83. The comparison small selection circuit 68 compares the magnitudes of the output of the comparison small selection circuit 67 and the SD pixel k5 and selects and outputs smaller one. Thus, the minimum one of the SD pixels k1 to k5 is output from the comparison small selection circuit 68.

Figure 12:
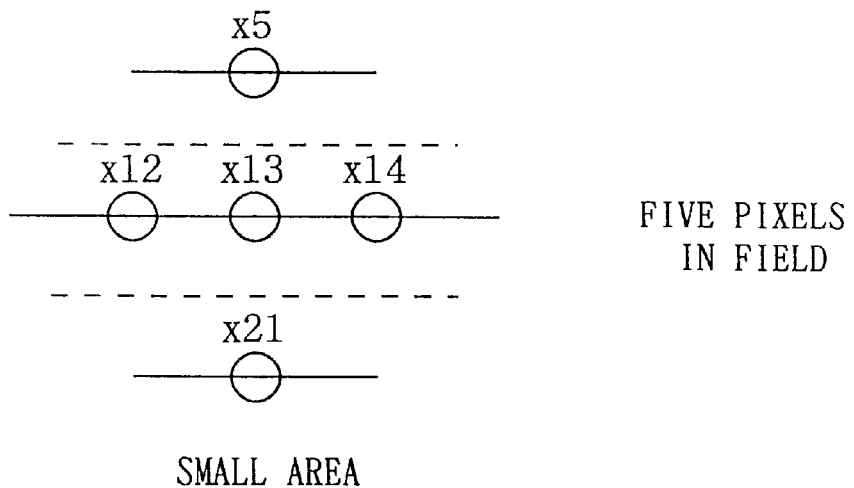
FIG. 12 is an illustration for explaining pixels in a small area.

Moreover, the classification section 33 requires the maximum value and minimum value of small areas and the maximum value and minimum value of large areas. Therefore, the maximum- and minimum-value operation section 32 operates the maximum value and minimum value of the small areas and the maximum value and minimum value of the large areas similarly to the above-described case. In this case, the small areas represent five SD pixels x5, x12, x13, x14, and x21 in the same field located at the top and bottom and the right and left of the noticed SD pixel x13 as shown in FIG. 12. The maximum- and minimum-value operation section 32 obtains the maximum value and minimum value of these five SD pixels similarly to the above-described case and outputs them to the classification section 33.

Figure 13:
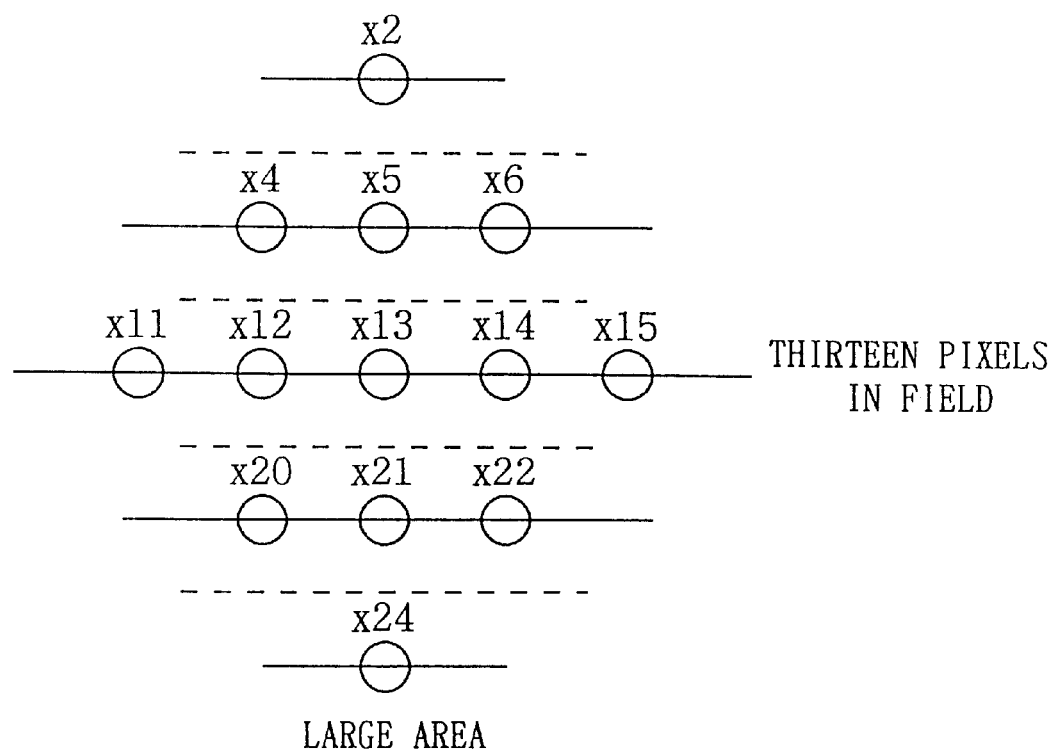
FIG. 13 is an illustration for explaining pixels in a large area.

Moreover, the large areas represent the following 13 pixels: the noticed SD pixel x13, SD pixels x1, x12, x14, and x15 located on the same line in the same field, SD pixels x4 to x6 and x20 to x22 located on the lines upper and lower than the above line, and SD pixels x2 and x24 located on the lines upper and lower than the above lines as shown in FIG. 13. The maximum- and minimum-value operation section 32 obtains the maximum and minimum values of these 13 pixels similarly to the above-described case and outputs them to the classification section 33.

Figure 14:
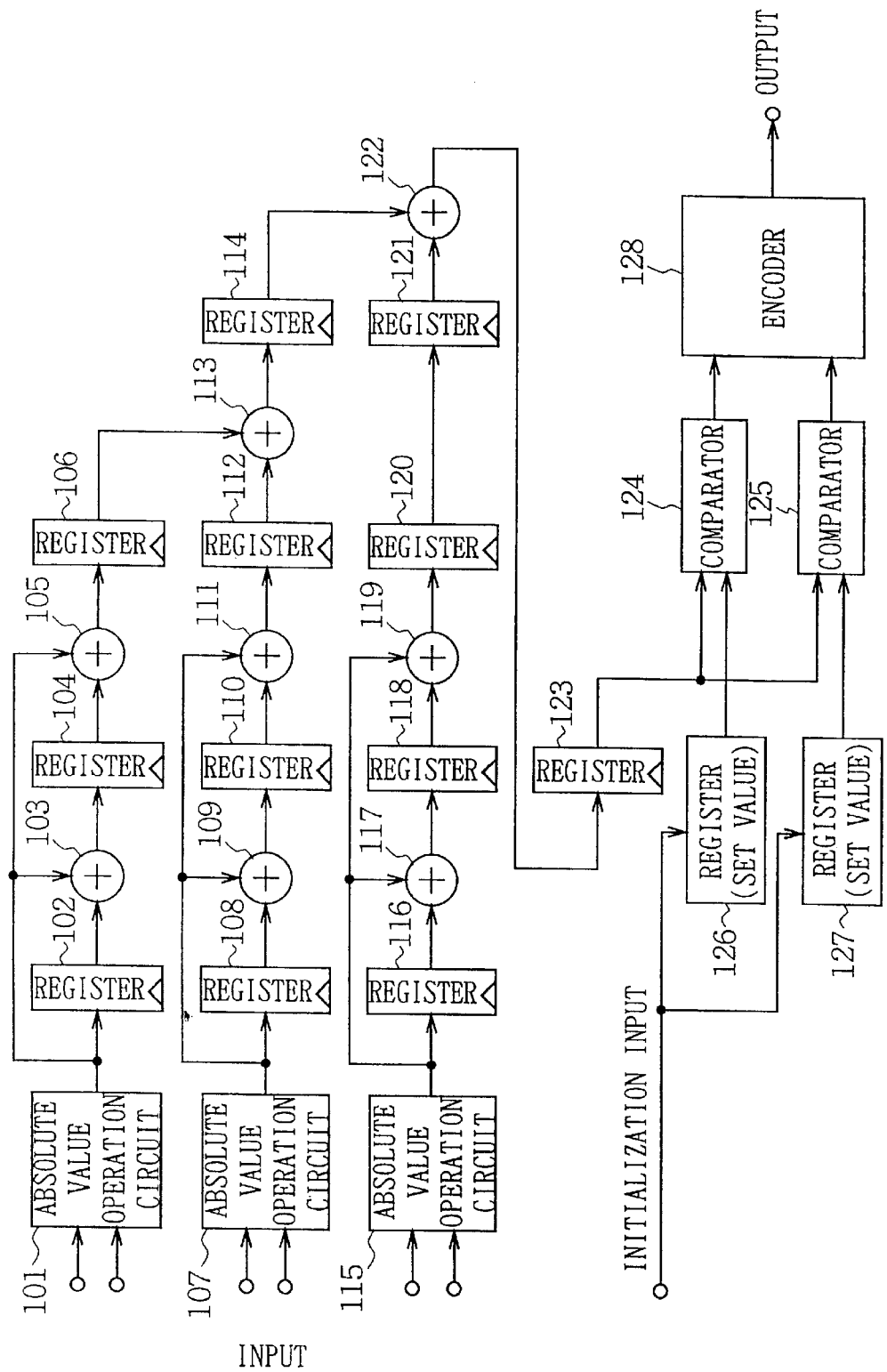
FIG. 14 is a block diagram showing a structural example of the movement decision circuit 34 in FIG. 6.
Figure 15:
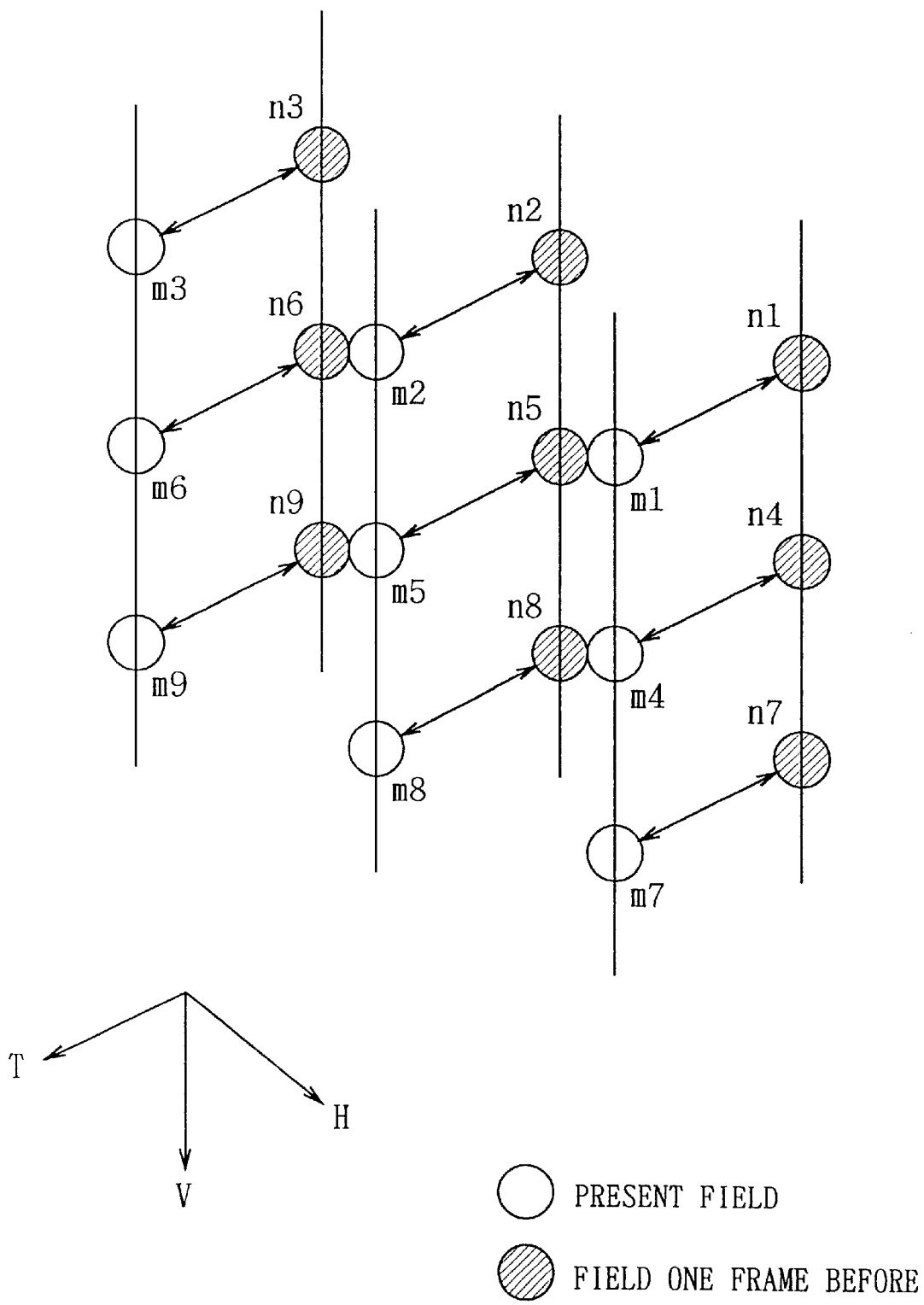
FIG. 15 is an illustration for explaining the processing by the absolute value operation circuit 101 in FIG. 14.

FIG. 14 shows a structural example of the movement decision section 34. This structural example shows a structural example when performing movement decision by using 3 ʒ 3SD pixels m1 to m9 in the present field and SD pixels n1 to n9 at spatially corresponding positions one frame before as shown in FIG. 15.

As shown in FIG. 14, SD pixels in the uppermost line (SD pixels m1 to m3 and SD pixels n1 to n3 in FIG. 15) among 3 ʒ 3SD pixels are input to an absolute value operation circuit 101, SD pixels in the next line (SD pixels m4 to m6 and SD pixels n4 to n6 in FIG. 15) are input to an absolute value operation circuit 107, and SE pixels in the lowermost line (SD pixels m7 to m9 and SD pixels n7 to n9 in FIG. 15) are input to an absolute value operation circuit 115. The absolute value operation circuit 101 operates the absolute value of the difference between two input SD pixels and outputs the operation result to a register 102, adder 103, and adder 105. The adder 103 adds the output of the register 102 and the output of the absolute value operation circuit 101 and outputs the addition result to a register 104. The adder 105 adds the output of the register 104 and the output of the absolute value operation circuit 101 and outputs the addition result to a register 106.

Similarly, the absolute value of the difference between two SD pixels output from the absolute value operation circuit 107 is supplied to a register 107 and adders 109 and 111. The adder 109 adds the output of the register 108 and the output of the absolute value operation circuit 107 and outputs the addition result to a register 110. The adder 111 adds the output of the register 110 and the output of the absolute value operation circuit 107 and outputs the addition result to a register 112. An adder 113 adds the output of the register 106 and the output of the register 112 and outputs the addition result to a register 114.

The absolute value operation circuit 115 operates the absolute value of the difference between two input SD pixels and outputs the operation result to a register 116 and adders 117 and 119. The adder 117 adds the output of the register 116 and the output of the absolute value operation circuit 115 and outputs the addition result to a register 118. The adder 119 adds the output of the register 118 and the output of the absolute value operation circuit 115 and outputs the addition result to a register 120. The output of the register 120 is supplied to a register 121. An adder 122 adds the output of the register 114 and the output of the register 121 and outputs the addition result to a register 123.

A predetermined set value (threshold) is input to and held by registers 126 and 127 in an initial state. A comparator 124 compares the magnitudes of the value held by the register 123 and the set value (threshold) held by the register 126 and outputs the comparison result to an encoder 128. A comparator 125 compares the magnitudes of the value held by the register 123 and the set value (threshold) held by the register 127 and outputs the comparison result to the encoder 128. The encoder 128 performs encoding corresponding to the output of the comparator 124 and the output of the comparator 125.

Then, the operations are described below. The absolute value operation circuit 101 operates the absolute value of the difference between the SD pixel m1 in the present field and the SD pixel n1 at a corresponding spatial position one frame before and outputs the operation result to the register 102 to make the register 102 hold the result. At the next timing, the absolute value operation circuit 101 operates the absolute value of the difference between the SD pixels m2 and n2 and outputs the operation result to the adder 103. The adder 103 adds the absolute value of the difference between the SD pixels m1 and n1 output from the register 102 and the absolute value of the difference between the SD pixels m2 and n2 output from the absolute value operation circuit 101 and outputs the addition result to the register 104 to make the register 104 hold the result.

Moreover, at the next timing, the absolute value of the difference between the SD pixels m3 and n3 is operated by the absolute value operation circuit 101 and output to the adder 105. The adder 105 adds the absolute value of the difference between the SD pixels m3 and n3, absolute value of the difference between the SD pixels m1 and n1 held by the register 104, and absolute value of the difference between the SD pixels m2 and n2 and outputs the addition result to the register 106 to make the register 106 hold the sum.

Thus, the register 106 holds the sum of the absolute value of the difference between the SD pixels m1 and n1, the absolute value of the difference between the SD pixels m2 and n2, and the absolute value of the difference between the SD pixels m3 and n3 on the uppermost line shown in FIG. 15.

The same processing is applied to SD pixels on the second and third lines and the register 112 on the second line holds the sum of the absolute value of the difference between the SD pixels m4 and n4, the absolute value of the difference between the SD pixels m5 and n5, and the absolute value of the difference between the SD pixels m6 and n6. Moreover, the register 120 on the third line holds the sum of the absolute value of the difference between the SD pixels m7 and n7, the absolute value of the difference between the SD pixels m8 and n8, and the absolute value of the difference between the SD pixels m9 and n9.

The adder 113 adds the value held by the register 106 and the value held by the register 112 and outputs the addition result to the register 114. The output of the register 114 is supplied to the adder 122. The value held by the register 120 is supplied to the adder 122 through the register 121. Therefore, the adder 122 adds the output of the register 114 and the output of the register 121 and outputs the addition result to the register 123.

Thus, resultingly, the register 123 holds the sum of the absolute values of the differences between the SD pixels m1 to m9 on one hand and the SD pixels n1 to n9 on the other shown in FIG. 15. That is, the following Equation is operated by the above circuits.

$$S = \sum_{i=1}^{9} |m_i - n_i| \tag{1}$$

The comparator 124 compares the value S held by the register 123 with the threshold held by the register 126 and outputs 1 to the encoder 128 when the value S is larger than the threshold and 0 to the encoder 128 when the value S is smaller than the threshold. Similarly, the comparator 125 compares the value S held by the register 123 with the threshold held by the register 127 (assumed as a value smaller than the threshold held by the register 126) and outputs 1 to the encoder 128 when the value S is larger than the threshold and 0 to the encoder 128 when the value S is smaller than the threshold. The encoder 128 outputs 0 as a class (movement class) for mainly showing a degree of movement when the outputs of the comparators 124 and 125 are both 0, outputs 1 when the output of the comparator 124 is 0 and the output of the comparator 125 is 1, and outputs 2 when the output of the comparator 124 is 1 even if the output of the comparator 125 is any one of 0 and 1.

In the above case, the absolute values of differences are operated by the absolute value operation circuits 101, 107, and 115. However, it is also possible to operate ½ the absolute values of differences. In this case, values to be held by the registers 126 and 127 are also assumed as values corresponding to the absolute values of differences for one pixel.

Figure 16:
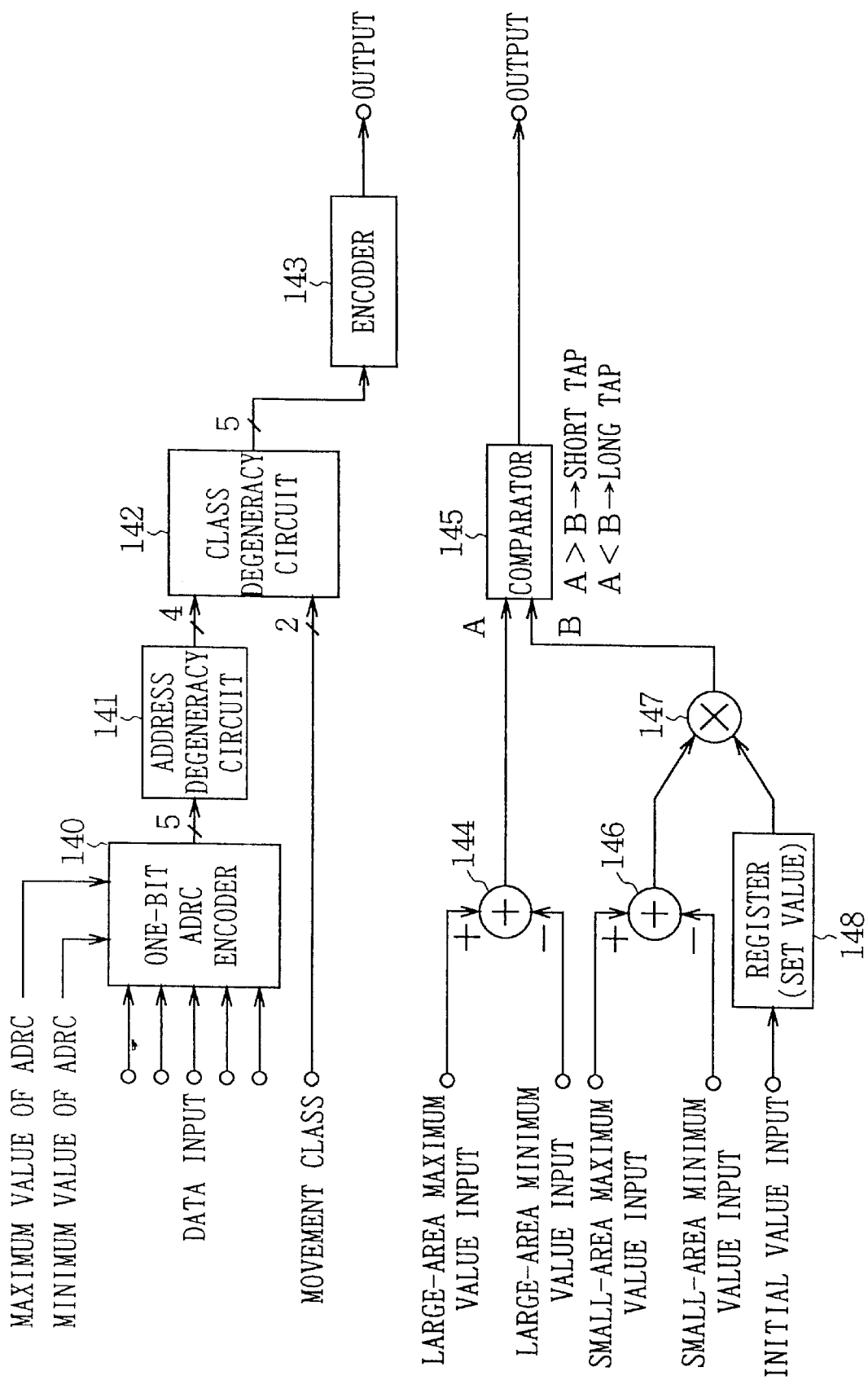
FIG. 16 is a block diagram showing a structural example of the classification section 33 in FIG. 6.

FIG. 16 shows a structural example of the classification section 33. The SD pixels k1 to k5 shown in FIG. 11 (corresponding to the SD pixels x5, x8, x13, x1B, and X21 in FIG. 4) are input to an ADRC (Adaptive Dynamic Range Coding) encoder 140 from the delay register section 31. Moreover, the maximum value and minimum value of a space class output from the maximum- and minimum-value operation section 32 are input to the ADRC encoder 140. The ADRC encoder 140 operates a re-quantization code Q shown by the following Equation when assuming each value of the SD pixels k1 to k5 as L, the maximum value of the SD pixels k1 to k5 as MAX, and the minimum value of the SD pixels k1 to k5 as MIN.

$$Q = [(L-MIN+0.5) \times 2^n/DR] \tag{2}$$

The brackets [ ] in the above Equation represent the round-down processing and DR is shown by the following Equation.

$$DR = MAX - MIN + 1 \tag{3}$$

Symbol n represents bit assignment. For example, in the case of one-bit ADRC, n is set to 1.

Thus, five SD pixels are respectively shown by a one-bit re-quantization code Q and assumed as SD pixels of a total of five bits.

Figure 17:
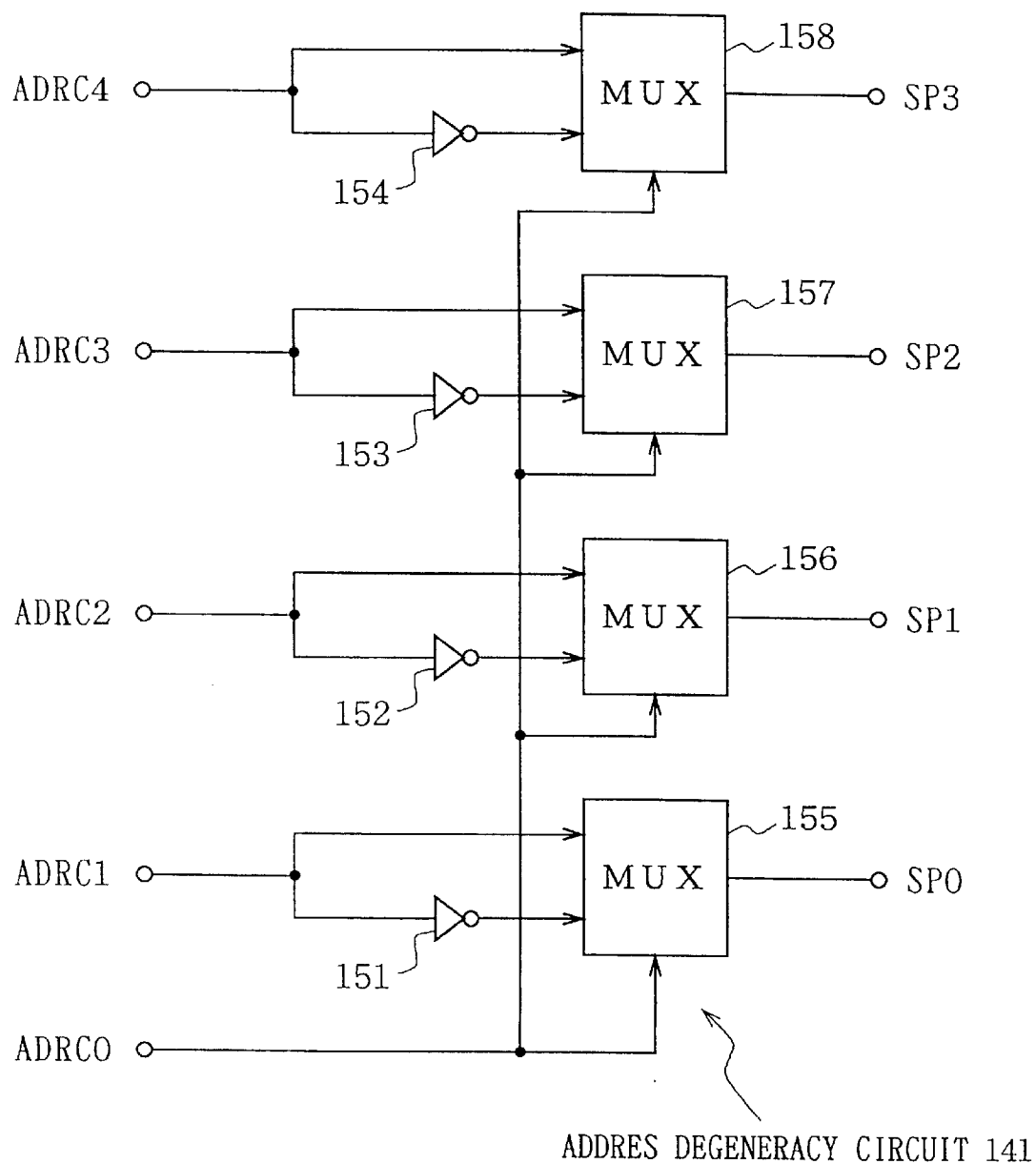
FIG. 17 is a block diagram showing a structural example of the address degeneracy circuit 141 in FIG. 16.

The five-bit spatial-class data output from the ADRC encoder 140 is input to an address degeneracy circuit 141 and degenerated to four-bit data. FIG. 17 shows a structural example of the address degeneracy circuit 141.

As shown in FIG. 17, five-bit outputs of the ADRC encoder 140 corresponding to the SD pixels k1 to k5 are used as ADRC0 to ADRC4. The ADRC0 is supplied to multiplexers 155 to 158 as its switching signal. The ADRC1 is input to the multiplexer 155 directly or by being inverted by an inverter 151. The ADRC2 is input to the multiplexer 156 directly or by being inverted by an inverter 152. The ADRC3 is input to the multiplexer 157 directly or by being inverted by an inverter 153. The ADRC4 is input to the multiplexer 158 directly or by being inverted by an inverter 154.

When the ADRC0 is set to 0, the multiplexers 155 to 158 select the ADRC1 to ADRC4 and output them as four-bit data values SP0 to SP3 However, when the ADRC0 is set to 1, the multiplexers 155 to 158 select the outputs of their corresponding inverters 151 to 154 and output them as SP0 to SP3.

Thus, the five-bit space class is converted into a four-bit space class and output to the class degeneracy circuit 142. Thereby, for example, the data "01111" is converted into "1111", the data "10000" is also converted into "1111", and they are made into a common class.

Moreover, a two-bit movement class output from the encoder 128 of the movement decision section 34 is supplied to the class degeneracy circuit 142. That is, class codes of a total of six bits are input to the class degeneracy circuit 142.

The class degeneracy circuit 142 degenerates the class codes of six bits to class codes of five bits and outputs them to an encoder 143. The encoder 143 encodes and outputs the input class codes of five bits.

Figures 18, 19:
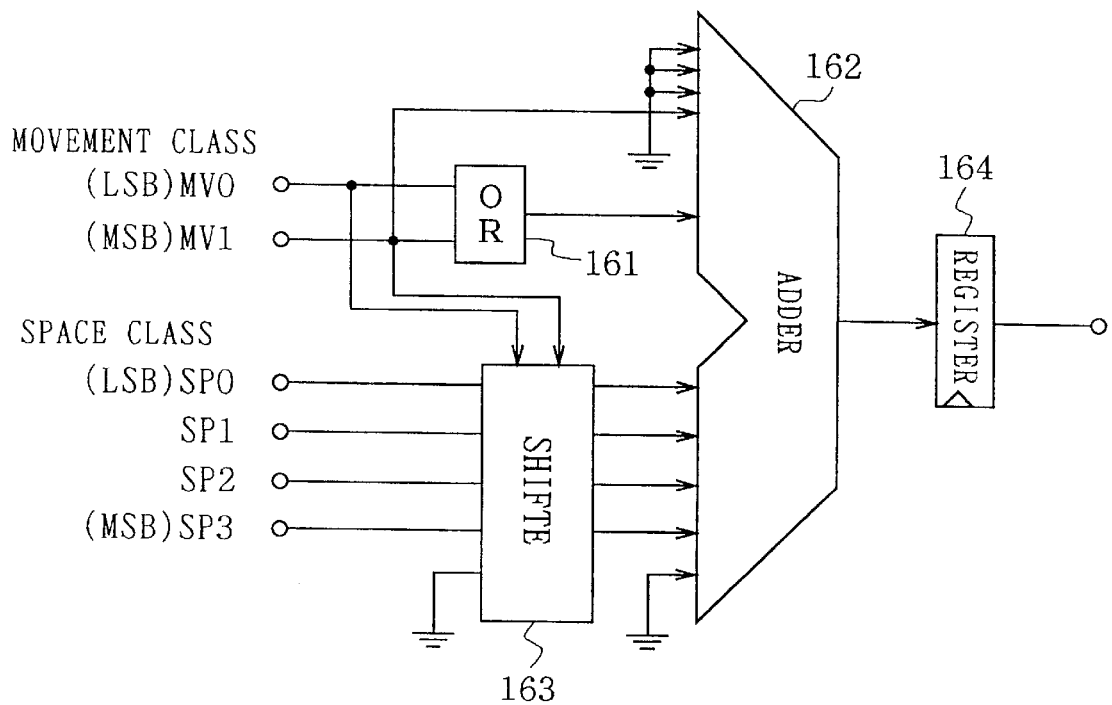
FIG. 18 is a block diagram showing a structural example of the class degeneracy circuit 142 in FIG. 16.
FIG. 19 is an illustration for explaining the operation of the class degeneracy circuit 142 in FIG. 16.

The class degeneracy circuit 142 is constituted as, for example, shown in FIG. 18. In the case of the example in FIG. 18, MV1 as the MSB of a two-bit movement class MV and MB0 as the LSB of the class MV output from the movement decision section 34 are supplied to an OR circuit 161. The output of the OR circuit 161 is input to the MSB terminal of one input of an adder 162. The MV1 as the MSB of a movement class is input to the second bit from the MSB of one input of the adder 162. Low-order three bits of one input of the adder 162 are earthed and set to 0.

SP3 of the MSB among the data values SP3 to SP0 which are five-bit spatial-class data values output from the ADRC encoder 140 and degenerated to four bits by the address degeneracy circuit 141 is input to the second terminal from the MSB of a shifter 163, SP2 is input to the second terminal from the MSB, SP1 is input to the third terminal from the MSB, and SP0 is input to the terminal of the LSB. The terminal of the MSB of the shifter 163 is earthed and set to 0.

The shifter 163 operates correspondingly to a movement class. When the number of movement classes is 0, the shifter 163 directly inputs the data of input low-order four bits to low-order four bits of the other input of the adder 162. However, when the number of movement classes is not 0 (that is, when the number of movement classes is 1 or 2), the shifter 163 shifts the data of low-order four bits to the LSB side one bit by one bit. That is, the shifter 163 substantially converts the input data into a value of ½. Moreover, the shifter 163 supplies the shifted data to low-order four bits of the other input of the adder 162. The MSB of the other input of the adder 162 is earthed and kept at 0.

The adder 162 adds the data of five bits supplied from one input and the data of five bits supplied from the other input, outputs the addition result to a register 164 to make the register 164 hold the result. The adder 162 of this example substantially constitutes the encoder 143 in FIG. 16.

Moreover, the maximum value and minimum value of the large areas shown in FIG. 13 are supplied to a subtracter 144 in the classification section 33 from the maximum- and minimum-value operation section 32. The subtracter 144 subtracts the minimum value from the input maximum and outputs the subtraction result to a comparator 145. The maximum value and minimum value of the small areas shown in FIG. 12 are input to a subtracter 146 from the maximum- and minimum-value operation section 32. The subtracter 146 subtracts the minimum value from the input maximum value and outputs the subtraction result to a multiplier 147. A predetermined set value is previously held by a register 148 in the initial state. The multiplier 147 multiplies the value input from the subtracter 146 by the coefficient held by the register 148 and outputs the multiplication result to the comparator 145. The comparator 145 compares the magnitudes of the output of the subtracter 144 and the output of the multiplier 147 and outputs a short-tap selection signal when the output of the subtracter 144 is larger than the output of the multiplier 147 and a long-tap selection signal when the output of the subtracter 144 is smaller than the output of the multiplier 147.

Then, the operations are described below. The ADRC encoder 140 operates a re-quantization code Q for each of the SD data values k1 to k5 of the input five pixels in accordance with the above Equation and outputs five-bit data values ADRC0 to ADRC4 as the data showing space classes. The five-bit data values are degenerated to four-bit data values SP3 to SP0 by the address degeneracy circuit 141 and supplied to the shifter 163 of the class degeneracy circuit 142. As described above, the movement classes MV1 and MV0 are also supplied to the class degeneracy circuit 142 from the movement decision section 34.

For example, it is assumed that a class code of six bits is constituted with a movement class of high-order two bits (MV1 and MV0) and a space class of low-order four bits (SP3, SP2, SP1, and SP0). When a class code is "010011", the OR circuit 161 outputs "1" to the MSB of one input of the adder 162 and "0" which is the MSB of the movement class to the next bit. Because low-order three bits of the other input of the adder 162 are always set to 0, "10000" is resultingly input to one input of the adder 162.

However, because the number of classes is 1 not 0, the shifter 163 converts "0011" input to the terminals SP3 to SP0 into "0001" by shifting "0011" to the LSB side one bit by one bit. The "0001" is input to low-order four bits of the other input of the adder 162. However, because the MSB of the other input is always set to 0, "00001" is resultingly supplied to the other input of the adder 162. As a result, the output of the adder 162 is set to "10001" and this is output to and held by the register 164. Thereby, the class code is degenerated from 19 (=010011) to 17 (=10001).

Similarly, when the class code is "10010", "11000" is input to one input of the adder 162 and "00010" is input to the other input of the adder 162. As a result, the output of the adder 162 is set to "11010" and the class code is degenerated from 37 (=100101) to 26 (=11010).

FIG. 19 shows a state in which classes are degenerated in the above manner. As shown in FIG. 19, when it is assumed that the number of movement classes is 0, 1 or 2 and the number of classes before degenerated is 0 to 15, 16 to 31, or 32 to 47, codes of six bits are required to show a total of 48 classes. However, by performing the class degeneracy processing by the class degeneracy circuit 142, the number of classes after degenerated is 0 to 15 when the number of movement classes is 0. However, by using 16 to 23 classes when the number of movement classes is 1 and 24 to 31 classes which are ½ the number of classes before degenerated when the number of movement classes is 2, a total number of classes reaches 32 and they can be shown by five bits. Therefore, the number of coefficients to be stored in a coefficient RAM section 40 to be described later decreases by the value equivalent to the decreased number of classes and it is possible to decrease the capacity of the coefficient RAM section 40 by the value equivalent to the decreased number of classes.

The subtracter 144 subtracts the minimum value of large areas from the maximum value of them and outputs the subtraction result to the comparator 145. The subtracter 146 subtracts the minimum value of small areas from the maximum value of them and outputs the subtraction result to the multiplier 147. The multiplier 147 multiplies the output of the subtracter 146 by the coefficient held by the register 148 and outputs the multiplication result to the comparator 145. A value set to the register 148 is used to make adjustment so that the difference between the maximum value and the minimum value of five SD pixels of the small areas shown in FIG. 12 becomes a value corresponding to the difference between the maximum value and the minimum value of 13 SD pixels of the large areas shown in FIG. 13. Moreover, the comparator 145 compares the magnitudes of the output of the subtracter 144 and the output of the multiplier 147 to decide whether there is a steep change.

When the output of the subtracter 144 is smaller than the output of the multiplier 147 (when there is no steep change), the comparator 145 outputs a long-tap selection signal. When the output of the subtracter 144 is larger than the output of the multiplier 147 (when there is a steep change), the comparator 145 outputs a short-tap selection signal. Thereby, when there is a steep change, a forecast range is narrowed to prevent a ringing component from occurring.

Figure 20:
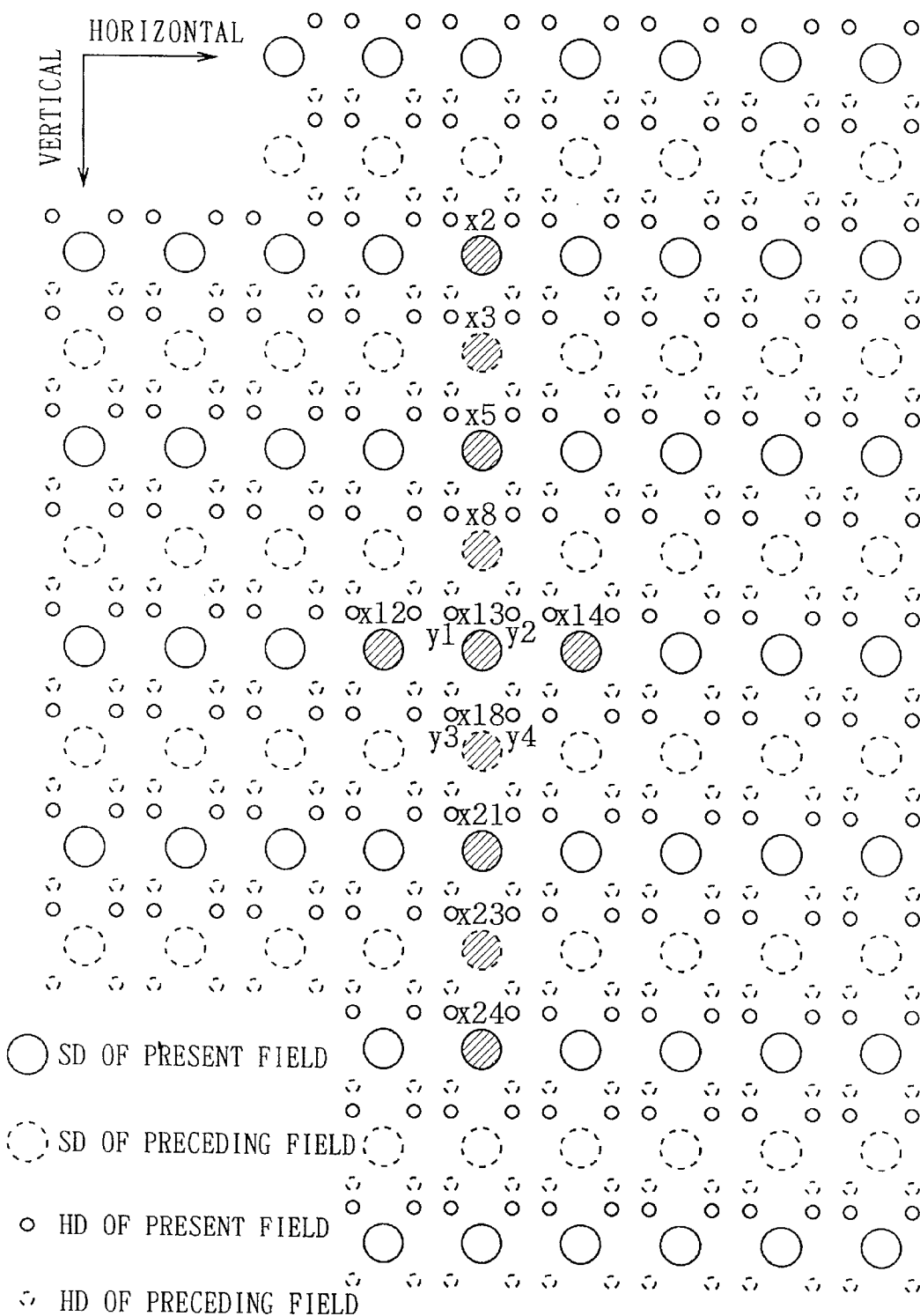
FIG. 20 is an illustration for explaining the range of pixels in a short tap mode.

Though details are described later, when a long-tap selection signal is output, HD pixels are operated by tap-degenerating 17 (17 taps) SD pixels of x1, x2, x4 to x6, x10 to x16, x20 to x22, and X24 present in the predetermined fields shown in FIG. 4 to generate the data for seven pixels (seven taps) and product-sum-operating coefficients for the seven taps by tap degeneracy sections 35 and 36 to be mentioned later. However, when a short tap is selected, HD pixels are obtained by product-sum-operating coefficients for seven SD pixels (seven taps) in which SD pixel data values x2, x5, x12 to x14, x21, and x24 are present as shown in FIG. 20. In any case, because the number of taps when coefficients are finally operated is determined as 7, it is possible to use the product-sum sections 38 and 39 as a circuit for performing the product-sum operation in common.

A control ROM section 37 controls the tap degeneracy sections 35 and 36 correspondingly to a class code and a long-tap or short-tap selection signal output from the classification section 33. That is, when a long-tap selection signal is input, the control ROM section 37 controls the tap degeneracy sections 35 and 36 to make the sections 35 and 36 capture the SD pixels of 17 taps in the present field shown in FIG. 4 such as x1, x2, x4 to x6, x10 to x16, x20 to x22, x24, and x25 from the delay register section 31. However, when a short-tap selection signal is input, the control ROM section 37 makes the tap degeneracy sections 35 and 36 capture seven SD pixels in the present field shown in FIG. 20 such as x2, x5, x12 to x14, x21, and x24 from the delay register section 31.

When the tap degeneracy sections 35 and 36 capture 17 SD pixels shown in FIG. 4, they degenerate the SD pixels to seven pixels and output them to the corresponding product-sum sections 38 and 39. Because a circuit for degenerating 17 pixels to 7 pixels has a large structure, it is difficult to illustrate the circuit. Therefore, hereafter, a structure of a tap degeneracy section when capturing seven pixels and degenerating them to three pixels is described below by referring to FIG. 21.

Figure 21:
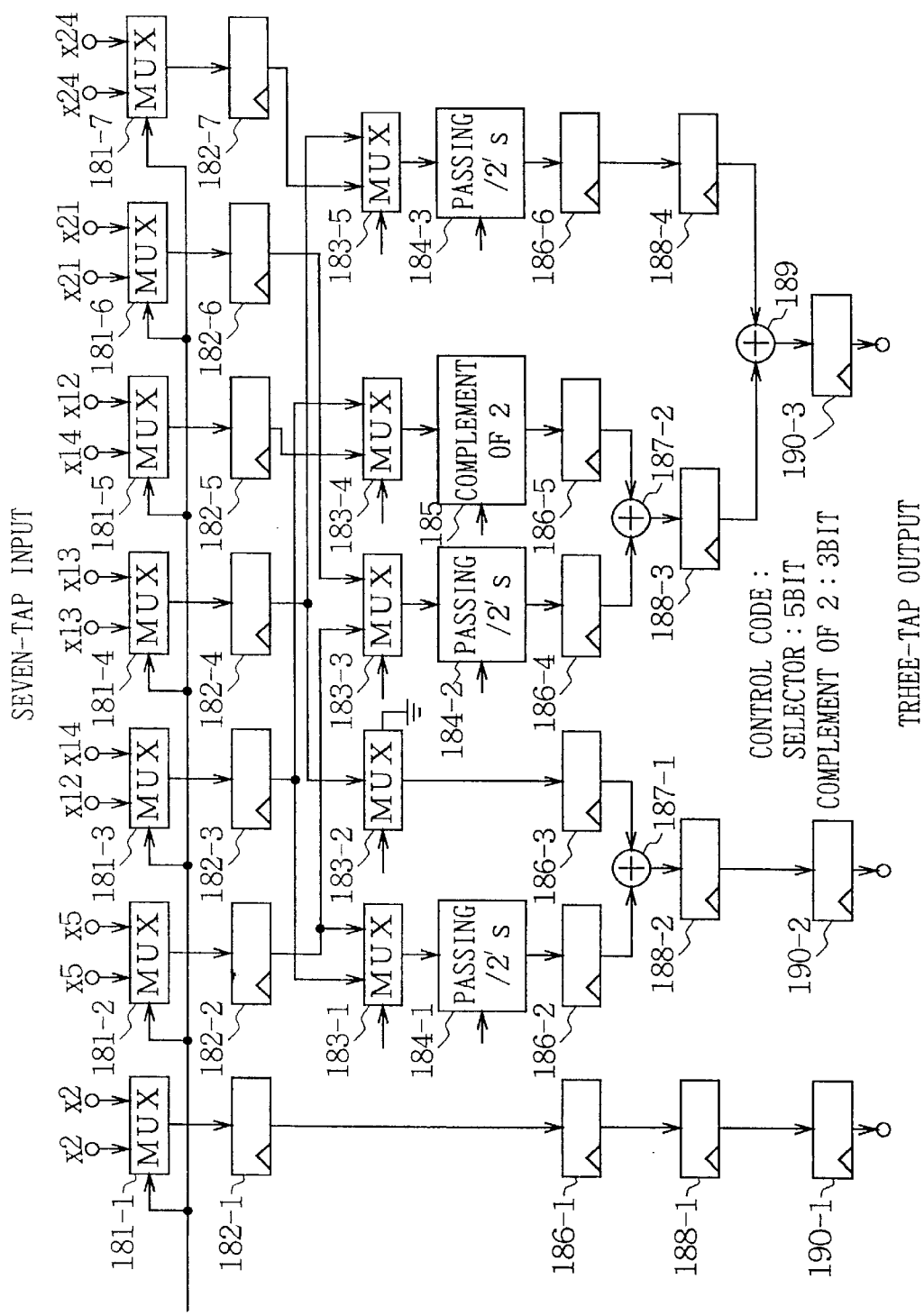
FIG. 21 is a block diagram showing a structural example of the tap degeneracy section 35 in FIG. 6.
Figure 22:
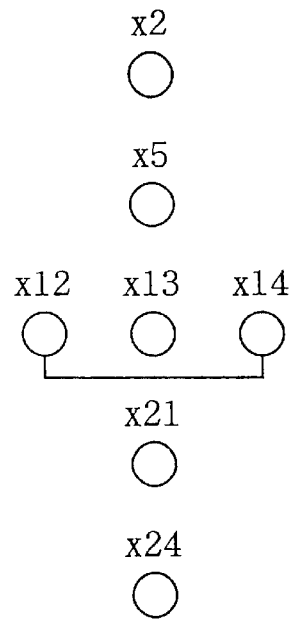
FIG. 22 is an illustration for explaining the range of pixels of seven taps.

FIG. 21 shows a structural example of the tap degeneracy section 35 in the mode 1. As shown in FIG. 21, the SD pixel x2 out of seven SD pixels shown in FIG. 22 is input to each of two input terminals of a multiplexer 181-1. The SD pixel x5 is supplied to both inputs of a multiplexer 181-2. The SD pixel x12 is supplied to the left input of a multiplexer 181-3 and the SD pixel x14 is supplied to the right input of the multiplexer 181-3. The SD pixel x13 is supplied to both inputs of a multiplexer 181-4. The SD pixel x14 is supplied to the left input of a multiplexer 181-5 and the SD pixel x12 is supplied to the right input of the multiplexer 181-5. The SD pixel x21 is supplied to both inputs of a multiplexer 181-6 and the SD pixel x24 is supplied to both inputs of a multiplexer 181-7.

That is, as shown in FIG. 22, pixels in which pixels right-left symmetric to a vertical line are present are supplied to one input and the other input of a corresponding multiplexer. Moreover, the inputs of one multiplexer and the other multiplexer are symmetrically arranged. That is, as shown in FIG. 21, the SD pixel x12 is supplied to the left input of the multiplexer 181-3 and the SD pixel x14 is supplied to the right input of the multiplexer 181-3. However, the SD pixel x14 is supplied to the left input of the multiplexer 181-5 and the SD pixel x12 is supplied to the right input of the multiplexer 181-5.

Moreover, the same pixel is supplied to both inputs of a multiplexer corresponding to pixels in which no corresponding pixel as line symmetry is present.

When a control signal having the logic 0 is input from the control ROM section 37, each of the multiplexers 181-1 to 181-7 selects and outputs the left input of right and left inputs. When the logic 1 is input, each of them selects and outputs the right input. Therefore, the SD pixel x2, x5, x12, x13, x14, x21, or x24 is held by the registers 182-1 to 182-7 when a control signal having the logic 0 is input to the multiplexers 181-1 to 181-7. However, when a control signal having the logic 1 is input to the multiplexers 181-1 to 181-7, the SD pixel x2, x5, x14, x13, x12, x21, or x24 is held.

Control of the registers 182-1 to 182-7 downward is performed at a speed two times higher than the speed of the control of the multiplexers 181-1 to 181-7.

As described by referring to FIG. 20, to generate the HD pixel y1 at the left top:of the SD pixel x13, the logic 0, for example, is input to the multiplexers 181-1 to 181-7. To generate the HD pixel y2 at the right top of the SD pixel x13, the logic 1 is input to the multiplexers 181-1 to 181-7.

The pixel data held by the register 182-1 is directly output through registers 186-1, 188-1, and 190-1.

The SD pixels held by a register 182-2 are supplied to the right input of a multiplexer 183-1 and the left input of a multiplexer 183-3. The output of a register 182-3 is supplied to the left input of the multiplexer 183-1 and the right input of a multiplexer 183-4. The output of a register 182-4 is supplied to one input of a multiplexer 183-2 and the right input of a multiplexer 183-5. The output of a register 182-5 is supplied to the left input of the multiplexer 183-4. The output of the register 182-6 is supplied to the right input of the multiplexer 183-3. The output of the register 182-7 is supplied to the left input of the multiplexer 183-5.

The multiplexers 183-1 to 183-5 select one of the left and right inputs correspondingly to a control code supplied from the control ROM section 37 and output it to a circuit at the rear stage. The multiplexer 183-1 supplies the selected SD pixel data to a complement-of-2 circuit 184-1. The complement-of-2 circuit 184-1 directly outputs the data received from the multiplexer 183-1 to a register 186-2 correspondingly to a control signal supplied from the control ROM section 37 or outputs the operation result to the register 186-2 after performing the complement-of-2 operation. The complement-of-2 operation is performed by inverting is of bits of SD data into 0s and 0s into 1s and moreover, adding 1 to the LSB.

The multiplexer 183-2 selects the data supplied from the register 182-4 or 0 correspondingly to a control code sent from the control ROM section 37 and outputs it to a register 186-3. An adder 187-1 adds the output of the register 186-2 and that of the register 186-3 and outputs the addition result through registers 188-2 and 190-2.

The multiplexer 183-3 selects one of the outputs of the registers 182-2 and 182-6 correspondingly to a control code of the control ROM section 37 and supplies it to a complement-of-2 circuit 184-2. The complement-of-2 circuit 184-2 outputs the pixel data supplied from the multiplexer 183-3 to a register 186-4 directly or after performing the complement-of-2 operation correspondingly to a control code supplied from the control ROM section 37 similarly to the case of the complement-of-2 circuit 184-1.

The multiplexer 183-4 selects the output of the register 182-5 or 182-3 correspondingly to a control code supplied from the control ROM section 37 and outputs the selected pixel data to a complement-of-2 circuit 185. The complement-of-2 circuit 185 applies the complement-of-2 operation to the pixel data received from the multiplexer 183-4 and outputs the operation result to a register 186-5. An adder 187-2 adds the output of the register 186-4 and the output of the register 186-5 and outputs the addition result to a register 188-3.

The multiplexer 183-5 selects one of the outputs of the registers 182-7 and 182-4 correspondingly to a control code supplied from the control ROM section 37 and outputs the output to a complement-of-2 circuit 184-3. The complement-of-2 circuit 184-3 outputs the input pixel data to a register 186-6 directly or after performing the complement-of-2 operation correspondingly to a control code supplied from the control ROM section 37. The output of the register 186-6 is further supplied to a register 188-4.

An adder 189 adds the output of the register 188-3 and the output of the register 188-4 and outputs the addition result to a register 190-3.

Thus, the data for seven taps shown in FIG. 22 is converted into the data for three taps.

Because the picture data values close to each other have a strong autocorrelation, they are frequently right-left symmetric to the central SD pixel data. Therefore, it is possible to obtain both HD pixel y1 and HD pixel y2 by the substantially same circuit only by replacing SD pixels in the mirror image relation when obtaining HD pixels y1 in the horizontal mirror image relation and obtaining HD pixels y2 in the mirror image relation by the tap degeneracy section 35.

Similarly, when generating the HD pixel y3 and the HD pixel y4 in the horizontal mirror image relation by the tap degeneracy section 36, it is possible to perform the same tap degeneracy processing.

Figure 23:
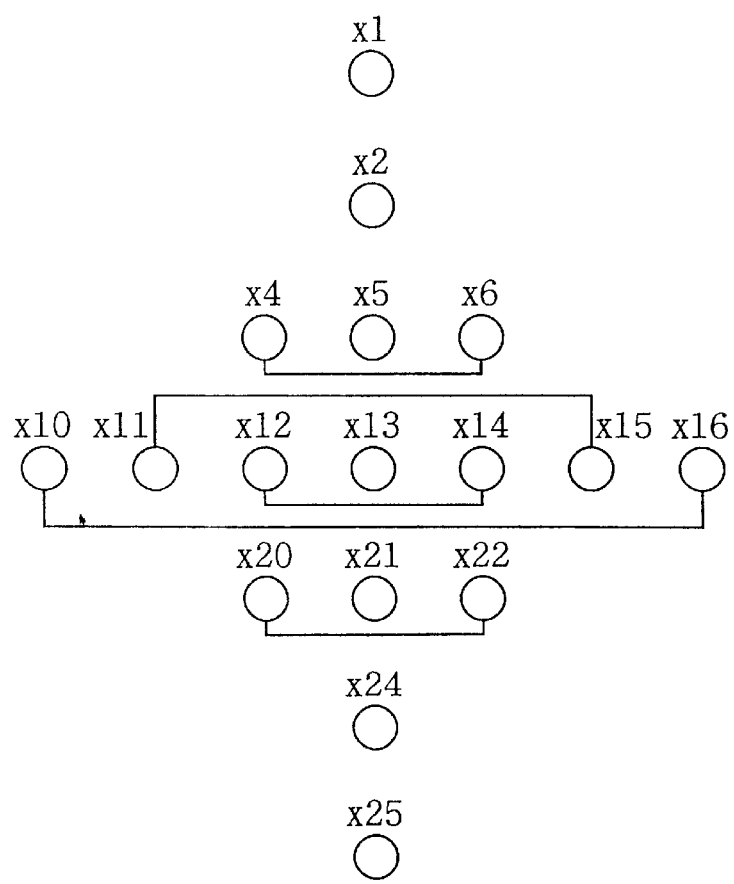
FIG. 23 is an illustration for explaining the range of pixels of 17 taps.

When capturing 17 taps and outputting 7 taps by the tap degeneracy sections 35 and 36, the mirror image relation shown in FIG. 23 is obtained. That is, the SD pixels x4 and x6 have the mirror image relation. Similarly, the SD pixels x10 and x16, x11 and x15, x12 and x14, and x20 and x22 are respectively have the mirror image relation.

The multiplexers 181-1, 181-2, 181-4, 181-6, and 181-7 to which pixel data not in the mirror image relation in FIG. 21 is input substantially always select the same pixel data. Therefore, it is also possible to omit these multiplexers.

As described above, in the long-tap mode, the data values for 7 taps degenerated from 17 taps by the tap degeneracy sections 35 and 36 are input to the product-sum sections 38 and 39 in the mode 1 and mode 2 respectively. In the short-tap mode, the data values for seven taps captured by the tap degeneracy sections 35 and 36 are directly input to the product-sum sections 38 and 39.

Figure 24:
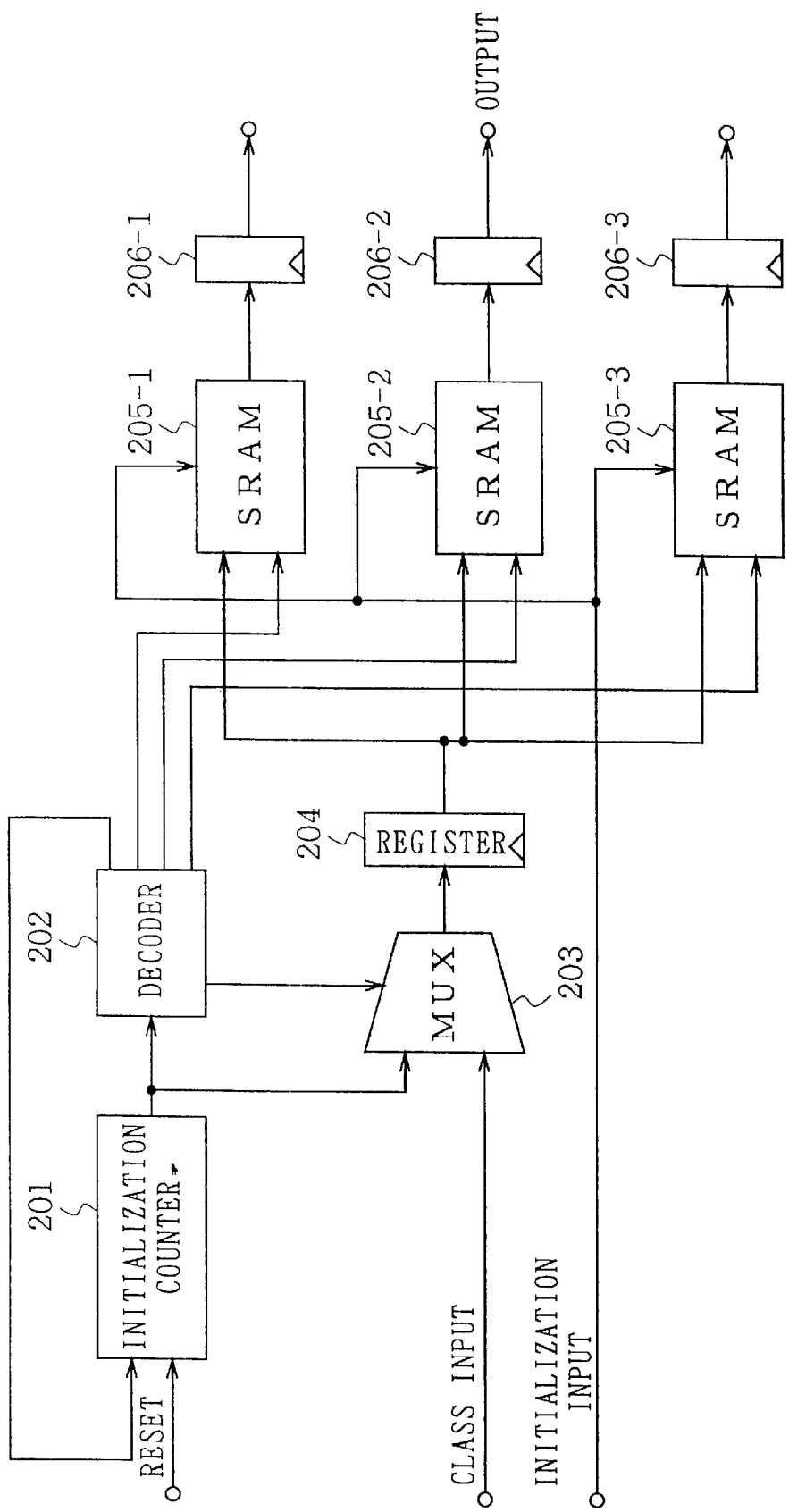
FIG. 24 is a block diagram showing a structural example of the coefficient RAM section 40 in FIG. 6.

FIG. 24 shows a structural example of the coefficient RAM section 40. This example shows a case of storing coefficients for three taps. In the case of the coefficient RAM section 40 in FIG. 6, however, coefficients for seven taps are stored as described above.

In the initialization mode, a decoder 202 brings SRAMs 205-1 to 205-3 into the write state. An initialization counter 201 counts clocks and outputs the counted value. The decoder 202 controls a multiplexer 203 in the initialization mode to make the multiplexer 203 select the output of the initialization counter 201. As a result, the counted value of the initialization counter 201 is supplied from the multiplexer 203 to a register 204 and held by the register 204. Moreover, the counted value held by the register 204 is supplied to the SRAMs 205-1 to 205-3 as a write address. Moreover, in this case, the coefficient data supplied from the initialization circuit 10 is supplied to the SRAMs 205-1 to 205-3. As a result, the coefficients supplied to the SRAMs 205-1 to 205-3 from the initialization circuit 10 are written in the addresses designated by the initialization counter 201.

Thus, when all necessary coefficients are written in the SRAMs 205-1 to 205-3, the initialization counter 201 is reset correspondingly to a reset signal supplied from the initialization circuit 10. When the initialization counter 201 is reset, the decoder 202 sets the SRAMs 205-1 to 205-3 to the read mode, controls the multiplexer 203 to make the multiplexer 203 select the class code output by the encoder 143 of the classification section 33 and supply the code to the register 204. As a result, the class codes held by the register 204 are supplied to the SRAMs 205-1 to 205-3 as read addresses. Therefore, coefficients corresponding to the class codes are read from the SRAMs 205-1 to 205-3 and output through registers 206-1 to 206-3. The coefficients thus read are supplied to the product-sum sections 38 and 39.

Here, the coefficient to be stored in the coefficient RAM section 40 for each class can be computed using, for example, the learning method described in the Japanese Patent Laid Open No. 9-51510 (laid-opened on Feb. 18, 1997). That is, to compute the coefficient for each class by learning, a known HD signal is used as a learning signal. More specifically, in the HD signal, this HD noticed pixel is represented by a linear primary combined model using coefficients by a pair of learning data consisting of circumference HD interpolation pixels and SD pixels. The coefficients used at this time is obtained using a root-square method for each class. As the above, when obtaining a coefficient using a learning signal, if many learning data are generated using not only one HD signal but plural picture signal, further correct coefficient can be obtained. Note that, its further detail is omitted here by referring to the above application.

Figure 25:
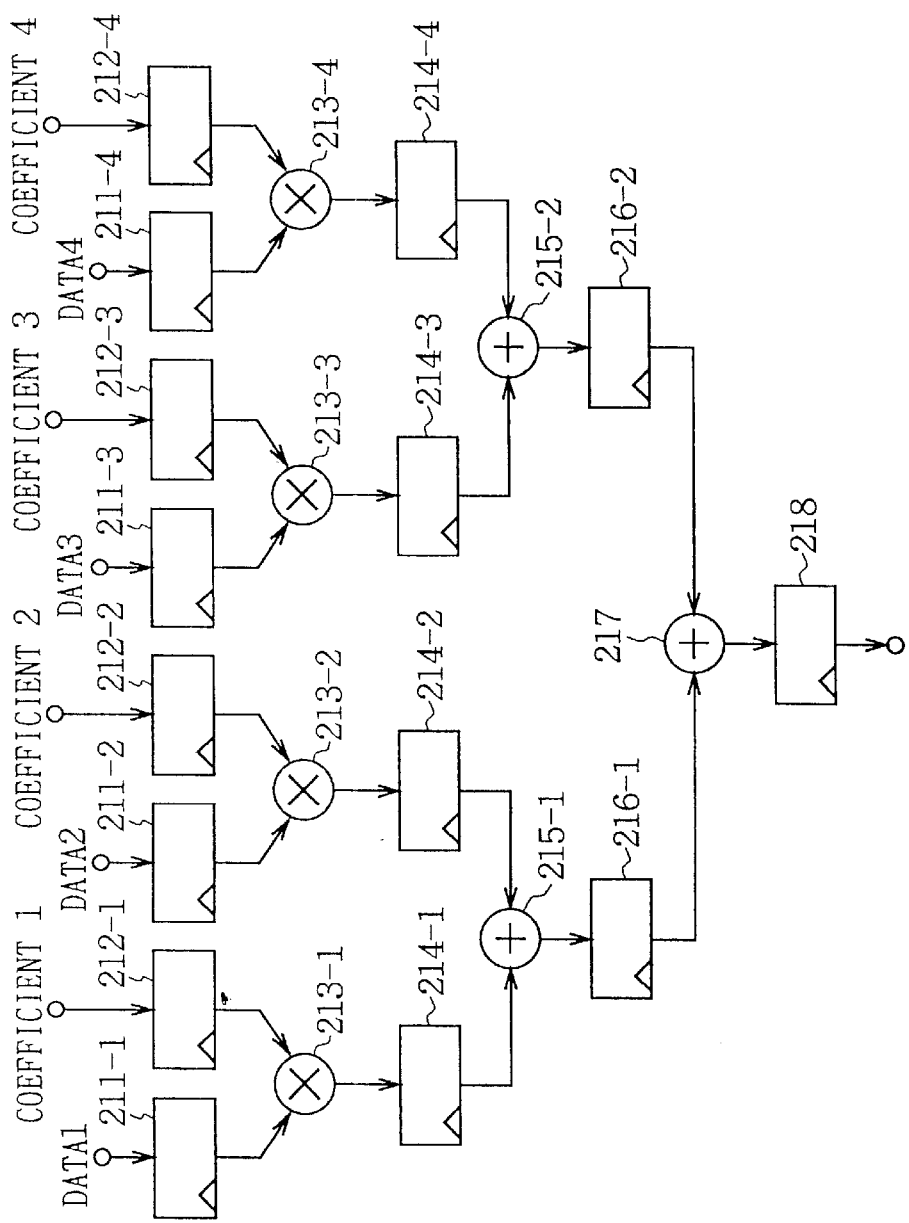
FIG. 25 is a block diagram showing a structural example of the product-sum section 38 in FIG. 6.

FIG. 25 shows a structural example of the product-sum section 38. As described above, the product-sum section 38 (also, the product-sum section 39) multiplies the data for seven taps supplied from the tap degeneracy section 35 by seven coefficients supplied from the coefficient RAM section 40 to obtain one HD pixel data value through operation. For the sake of description, however, a structure for performing the product-sum operation for four taps is also shown in FIG. 25.

In FIG. 25, the pixel data values for four taps supplied from the tap degeneracy section 35 are held by registers 211-1 to 211-4. Moreover, the coefficient data values supplied from the coefficient RAM section 40 are held by registers 212-1 to 212-4. A multiplier 213-1 multiplies the pixel data held by the register 211-1 by the coefficient data held by the register 212-1 and outputs the multiplication result to a register 214-1. A multiplier 213-2 multiplies the pixel data held by a register 212 by the coefficient data held by a register 212-2 and outputs the multiplication result to a register 214-2.

An adder 215-1 adds the value held by the register 214-1 and the value held by the register 214-2 and outputs the addition result to a register 216-1.

Similarly, the pixel data held by a register 211-3 and the coefficient data held by a register 212-3 are multiplied each other by a multiplier 213-3 and held by a register 214-3. Moreover, the pixel data held by the register 211-4 and the coefficient data held by the register 212-4 are multiplied each other by a multiplier 213-4 and held by a register 214-4.

An adder 215-2 adds the value held by the register 214-3 and the value held by the register 214-4 and outputs the addition result to a register 216-2 to make the register 216-2 hold the result.

An adder 217 adds the value held by the register 216-1 and the value held by the register 216-2 and outputs the addition result through a register 218.

That is, when assuming the pixel data values held by the registers 211-1 to 211-4 as x1 to x4 and the coefficients held by the registers 212-1 to 212-4 as w1 to w4 for convenience' sake in this circuit, the operation result shown by the following Equation is held by the register 218 as HD pixel data.

$$HD = x1 \times w1 + x2 \times w2 + x3 \times w3 + x4 \times w4 \quad (4)$$

Thus, the HD pixels y1 and y2 are operated and output to the scanning-line conversion circuit 11.

Similarly, in the product-sum section 39, the pixel data supplied from the tap degeneracy section 36 and the coefficient data supplied by the coefficient RAM section 40 are product-sum-operated and the HD pixels y3 and y4 are operated, and output to the scanning-line conversion circuit 11.

Thus, an HD pixel is generated from an SD pixel in the case of a luminance signal component. According to the same structure, it is possible to operate and generate an HD pixel from an SD pixel in the case of a color signal component. In this case, however, a coefficient RAM section for color signal components is necessary, the resolution creation unit 9 is increased in size, and the cost increases. In the case of this embodiment, a color signal component is processed by a structure different from the case of a luminance signal component.

That is, as shown in FIG. 6, the pixel data for color signal components for three lines input from the scanning-line conversion circuit 8 is input to and held by the delay register section 41. The structure of the delay register section 41 is basically the same as that of delay register section 31 for holding luminance signal components except that the number of lines is different from each other. The delay register section 41 holds a total of pixel data for three lines including the pixel data for color signal components of the lines of a noticed pixel and the pixel data for color signal components of the top and bottom lines of the same field.

The pixel data held by the delay register section 41 is input to the interpolation pixel operation section 42 in which the interpolation processing is applied to the pixel data.

Figure 26:
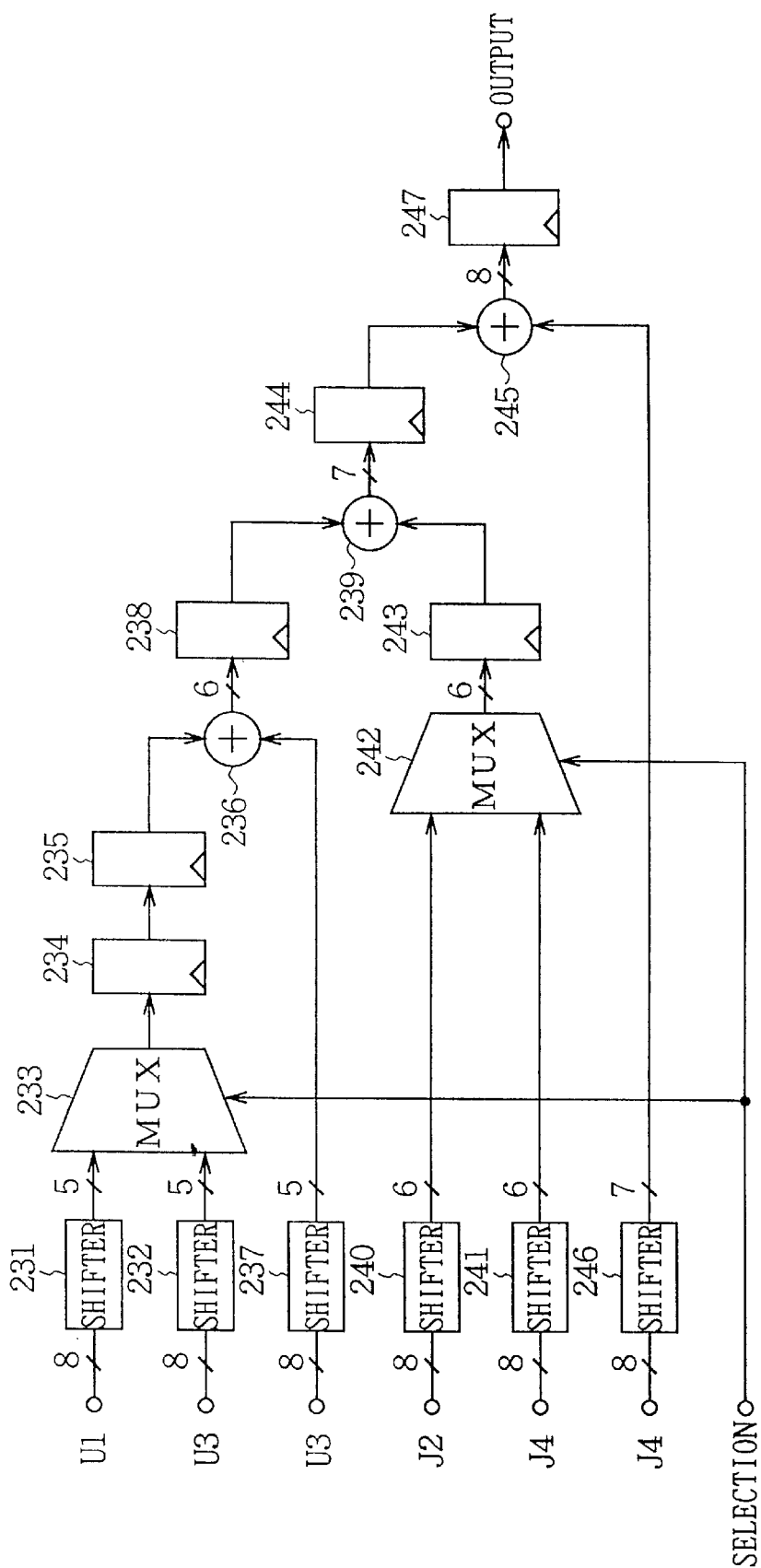
FIG. 26 is a block diagram showing a structural example of the interpolation pixel operation section 42 in FIG. 6.
Figure 27:
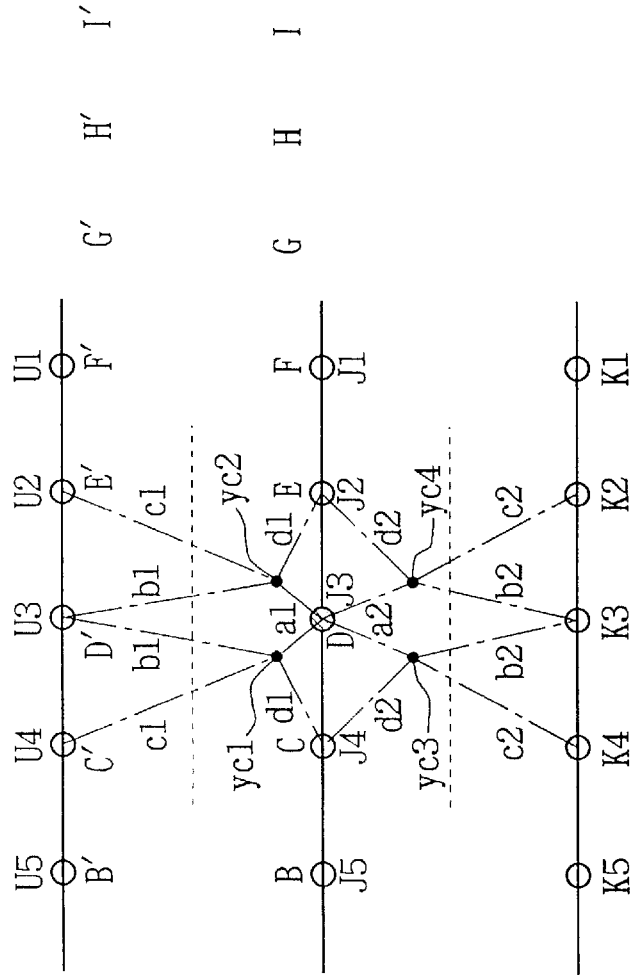
FIG. 27 is an illustration for explaining the operation of the interpolation pixel operation section 42 in FIG. 26.

FIG. 26 shows a structural example of the interpolation pixel operation section 42 in FIG. 6 when generating the HD pixels y1 and y2 in the mode 1. As shown in FIG. 27, the SD pixel data (SD pixel data of terminals U1 to U5) on the line at the upper side of HD pixels yc1 and yc2 and the SD pixel data (SD pixel data of terminals J1 to J5) on the line at the lower side of the HD pixels yc1 and yc2 are input to the interpolation pixel operation section 42. The SD pixel data of eight bits of the terminal U1 is shifted to the LSB side by three bits by a shifter 231 and input to a multiplexer 233 as the SD pixel data of five bits. Moreover, the SD pixel data of eight bits of the terminal U3 is shifted to the LSB side by three bits by a shifter 232 and input to a multiplexer 233 as the SD pixel data of five bits. The multiplexer 233 selects the SD pixel data input by the shifter 231 or 232 correspondingly to a selection signal. The output of the multiplexer 233 is supplied to an adder 236 through registers 234 and 235.

A shifter 237 shifts the data of eight bits input from the terminal U3 to the LSB side by three bits and supplies the data to the adder 236 as the data of five bits. The adder 236 adds the data of five bits supplied from the register 235 and the data of five bits supplied from the shifter 237 and supplies the addition result to an adder 239 as the data of six bits through a register 238.

A shifter 240 shifts the SD pixel data of eight bits of the terminal J2 to the LSB side by two bits and supplies the data to a multiplexer 242 as the data of six bits. A shifter 241 shifts the SD pixel data of eight bits of the terminal J4 to the LSB side by two bits and supplies the data to the multiplexer 242 as the data of six bits. The multiplexer 242 selects one of two inputs correspondingly to a selection signal and supplies the input to an adder 239 through a register 243.

The adder 239 adds the output of the register 238 and the output of the register 243 and supplies the data of seven bits to an adder 245 through a register 244.

A shifter 246 shifts the data of eight bits supplied from the terminal J4 to the LSB side by one bit and supplies the data to the adder 245 as the data of seven bits. The adder 245 adds the output of the register 244 and the output of the shifter 246 and outputs the data of eight bits through a register 247.

The shifters 231, 232, 237, 240, 241, and 246 in FIG. 26 can be substantially realized by wiring only predetermined bits at the rear stage from the MSB side.

As shown in FIG. 27, when assuming the distance between the HD pixels yc1 and yc2 generated in the mode 1 on one hand and the noticed SD pixel of the terminal J3 on the other as a1, the distance between the HD pixels yc1 and yc2 on one hand and the SD pixel of the terminal U3 on the other as b1, the distance between the HD pixels yc1 and yc2 on one hand and the SD pixels of the terminals U4 and U2 on the other as c1, and the distance between the HD pixels yc1 and yc2 on one hand and the SD pixels of the terminals J4 and J2 on the other as d1, the ratio between the inverse numbers of the distances is shown by the following Equation.

$$1/a1:1/b1:1/c1:1/d1 = \frac{1}{2}:\frac{1}{8}:\frac{1}{8}:\frac{1}{4} \quad (5)$$

Similarly, when assuming the distance between the HD pixels yc3 and yc4 generated in the mode 2 and the SD pixel of the terminal J3 as a2, the distance up to the SD pixel of the terminal K3 as b2, the distance up to the terminals K4 and K2 as c2, and the distance up to the SD pixels of the terminals J4 and J2 as d2, the ratio between the inverse numbers of the distances is shown by the following Equation.

$$1/a2:1/b2:1/c2:1/d2 = \frac{3}{8}:\frac{3}{16}:\frac{3}{16}:\frac{1}{4} \quad (6)$$

Then, the operations are described below by referring to the timing chart in FIG. 28. When assuming that SD pixels A' to I' are successively input to terminals U1 to U5 and SD pixels A to I are successively input to terminals J1 to J5 as shown in FIG. 27, the pixel data values of the terminals U1 to U5 or the terminals J1 to J5 are successively delayed from the adjacent terminal every clock as shown in FIG. 28.

The multiplexer 233 alternately selects one of two inputs at a period ½ the period of the shift of pixel data. Therefore, as shown in FIG. 28, when assuming that the register 234 holds the SD pixel E' supplied from the shifter 231 at a predetermined timing, it holds the SD pixel C' supplied from the shifter 232 at the next timing. The SD pixels E' and C' held by the register 234 are successively transferred to the register 235 at the rear stage.

When the SD pixel E' is held by the register 235 and supplied to one input of the adder 236, the SD pixel D' is supplied to the other input of the adder 236 from the shifter 237. Because the adder 236 adds two inputs and outputs the addition result to the register 238, data E'+D' is held by the register 238. Then, at the next timing, the adder 236 adds the SD pixel C' held by the register 235 and the SD pixel D' supplied from the shifter 237. Thus, data C'+D' is held by the register 238.

Similarly, the multiplexer 242 which alternately selects and outputs one of two inputs at a period ½ the period of a data transfer selects the SD pixel E supplied from the shifter 240 at the timing when the register 238 holds the data C'+D' and makes the register 243 hold the data and makes the register 243 hold the SD pixel C at the timing when the data C'+D' is held by the register 238.

The adder 239 adds the data held by the register 238 and the data held by the register 243 and outputs the addition result to the register 244. Therefore, at the timing next to the timing when data E'+D' is held by the register 238 and data E is held by the register 243, the register 244 holds data E'+D+E obtained by adding these two data values. Moreover, the register 244 holds data C'+D'+C at the still next timing.

At the timing when data E'+D+E is held by the register 244, the shifter 246 outputs the data D. Therefore, the data E'+D+E held by the register 244 and the data D output from the shifter 246 are added by the adder 245 and data E'+D'+E+D is held by the register 247. Similarly, at the next timing, data C'+D'+C is held by the register 244 and the data D is supplied from the shifter 246. Therefore, data C'+D'+C+D is held by the register 247.

As described by referring to FIG. 27, the data values E', C', D', E, C, and D respectively have the following relation with the pixel data of each terminal.

$$E' = (\tfrac{1}{8})U2 \quad (7)$$

$$C' = (\tfrac{1}{8})U4 \quad (8)$$

$$D' = (\tfrac{1}{8})U3 \quad (9)$$

$$E = (\tfrac{1}{4})J2 \quad (10)$$

$$C = (\tfrac{1}{4})J4 \quad (11)$$

$$D = (\tfrac{1}{2})J3 \quad (12)$$

Therefore, the data E'+D'+E+D represents the HD pixel yc2 shown by the following Equation.

$$yc2 = (\tfrac{1}{8})U2 + (\tfrac{1}{8})U3 + (\tfrac{1}{4})J2 + (\tfrac{1}{2})J3 \quad (13)$$

Moreover, the data C'+D'+C+D represents the HD pixel yc1 shown by the following Equation.

$$yc1 = (\tfrac{1}{8})U4 + (\tfrac{1}{8})U3 + (\tfrac{1}{4})J4 + (\tfrac{1}{2})J3 \quad (14)$$

A case of obtaining the HD pixels yc1 and yc2 in the mode 1 is described above. Also, in a case of obtaining the HD pixels yc3 and yc4 in the mode 2, operations are performed by the normal interpolation processing in accordance with the above-described Equations.

A case of converting an SD signal according to the NTSC system into an HD signal of hi-vision is described above as an example. However, the present invention is not restricted to the system. In short, the present invention can be applied to a case of generating high-quality pixel data from low-quality pixel data.

Note that, various modifications or examples of application can be considered within the scope not declining the tenor of the present invention. Therefore, the gist of the present invention is not only limited to this embodiment.

As described above, the signal converting apparatus and the signal converting method according to the present invention make it possible to decrease the capacity for storing coefficients and realize downsizing and cost decreasing because of product-sum-operating a coefficient obtained by learning and corresponding to a class for a luminance signal component, and product-sum-operating a picture signal before signal conversion, a coefficient based on the physical relationship of scanning lines after signal conversion and a color signal component, and performing the product-sum operation.

INDUSTRIAL CAPABILITY since a picture with an NTSC system is displayed on a high-vision television receiver, the present invention can be used in the case where high-definition pixel data is generated from a low-definition pixel data or the like, as a signal converting apparatus for converting an NTSC SD signal into a high-vision HD signal.

What is claimed is:

1. A signal converting apparatus for converting a first digital picture signal into a second digital picture signal, the number of pixels of said second digital picture signal being greater than that of the first signal, comprising:

a first changing means for changing the order of the scanning lines of the first digital picture signal based on a first mode and a second mode;

a memory for storing a coefficient to convert the first digital picture signal into the second digital picture signal for each class;

a class decision means supplied with outputs of said first changing means for deciding a class for each pixel of the first digital picture signal;

an arithmetic means for reading a coefficient corresponding to a class decided by said class decision means from said memory, and for generating a first pixel in said first mode and a second pixel in said second mode for each pixel of said first digital picture signal;

a second changing means supplied with outputs of said arithmetic means for changing the order of the scanning lines of said outputs of said arithmetic means based on said first mode and said second mode and thereby outputting the second digital picture signal.

2. The signal converting apparatus according to claim 1, wherein said first changing means does not change the order in said first mode and changes the order in said second mode and said second changing means changes the order before changing by said first change means.

3. The signal converting apparatus according to claim 1, wherein the first and second digital picture signals have a luminance signal component and a color signal component.

4. The signal converting apparatus according to claim 3, wherein said arithmetic means includes a first arithmetic circuit for reading a coefficient corresponding to a class decided by said class decision means from said memory, performing a product-sum-operation of the read coefficient and the luminance signal component of the first picture signal, and obtaining said luminance signal component of said second digital picture signal, and a second arithmetic circuit for performing the product-sum-operation of a coefficient based on the physical relationship of the scanning lines of the first digital picture signal and the second digital picture signal, and said color signal component of the first digital picture signal, and obtaining said color signal component of the second digital picture signal.

5. The signal converting apparatus according to claim 1, wherein:

said class decision means decides a class from a spatial characteristic and the amount of movement of the first digital picture signal.

6. The signal converting apparatus according to claim 1, further including:

a first degeneracy circuit for degenerating the number of taps of the first digital picture signal to obtain the second digital picture signal.

7. The signal converting apparatus according to claim 6, further including:

a control circuit for controlling said first degeneracy circuit based on the result of comparison obtained by comparing the spatial characteristic of a first area of the first digital picture signal with the spatial characteristic of a second area of the first digital picture signal larger than said first area.

8. The signal converting apparatus according to claim 1, wherein said class decision means degenerates the number of said classes.

9. The signal converting apparatus according to claim 4, wherein said first arithmetic circuit has a first product-sum circuit corresponding to the first mode and a second product-sum circuit corresponding to the second mode, and said first degeneracy circuit has a first tap degeneracy circuit corresponding to said first mode and a second tap degeneracy circuit corresponding to said second mode.

10. The signal converting apparatus according to claim 1, wherein the coefficient stored in said memory for each class is generated from a learning signal having the resolution of the second digital picture signal.

11. The signal converting apparatus according to claim 1, wherein each means is composed of one chip.

12. A signal converting method for converting a first digital picture signal into a second digital picture signal, the number of pixels of the second digital picture signal being greater than the number of pixels of the first digital picture signal, comprising the steps of:

changing the order of the scanning lines of the first digital picture signal based on a first mode and a second mode;

deciding a class for each pixel of the first digital picture signal whose order is changed in the step of changing;

reading a coefficient, from a memory for storing a coefficient to convert the first digital picture signal into said second picture signal for each class, corresponding to a class decided at the step of deciding and generating a first pixel in the first mode and a second pixel in the second mode for each pixel of the first digital picture signal;

changing the order of the scanning lines of the outputs of the step of reading, and generating, based on the first mode and the second mode and thereby outputting the second digital picture signal.

* * * * *